United States Patent
White et al.

(10) Patent No.: US 9,214,892 B2
(45) Date of Patent: Dec. 15, 2015

(54) SOLAR ARRAYS

(75) Inventors: Stephen F. White, Ventura, CA (US);
Mark V. Douglas, Santa Barbara, CA (US); Ronald S. Takeda, Santa Barbara, CA (US); Brian R. Spence, Solvang, CA (US); Noel T. Gregory, Santa Barbara, CA (US); Jason Z. Schmidt, Santa Barbara, CA (US); Peter Sorensen, Santa Barbara, CA (US); T. Jeffrey Harvey, Nederland, CO (US)

(73) Assignee: Orbital ATK, Inc., Dulles, VA (US)

( * ) Notice: Subject to any disclaimer, the term of this patent is extended or adjusted under 35 U.S.C. 154(b) by 1158 days.

(21) Appl. No.: 11/944,061

(22) Filed: Nov. 21, 2007

(65) Prior Publication Data
US 2009/0126775 A1    May 21, 2009

(51) Int. Cl.
H02N 6/00     (2006.01)
H01L 31/042   (2014.01)
B64G 1/00     (2006.01)
H02S 30/20    (2014.01)

(52) U.S. Cl.
CPC ............... *H02S 30/20* (2014.12); *H02S 30/00* (2013.01); *Y02E 10/50* (2013.01); *Y10S 136/292* (2013.01)

(58) Field of Classification Search
CPC ....... H01L 31/045; Y02E 10/50; H02S 30/00; H02S 30/20; Y10S 136/292
USPC .......................... 136/244–245; 244/173, 173.3
See application file for complete search history.

(56) References Cited

U.S. PATENT DOCUMENTS

| | | | |
|---|---|---|---|
| 3,706,230 A * | 12/1972 | Low et al. ............................ | 74/2 |
| 4,030,102 A | 6/1977 | Kaplan et al. | |
| 4,401,710 A | 8/1983 | Bansemir et al. | |
| 4,552,438 A * | 11/1985 | Murphy ........................ | 359/847 |
| 4,599,832 A | 7/1986 | Benton et al. | |
| 4,686,322 A | 8/1987 | Kujas | |
| 4,968,372 A | 11/1990 | Maass | |
| 5,296,044 A | 3/1994 | Harvey et al. | |
| 5,296,139 A | 3/1994 | Hanson et al. | |
| 5,578,139 A | 11/1996 | Jones et al. | |
| 5,833,176 A | 11/1998 | Rubin et al. | |
| 5,909,860 A * | 6/1999 | Lee ............................ | 244/172.6 |
| 6,028,570 A * | 2/2000 | Gilger et al. ................... | 343/915 |
| 6,091,016 A | 7/2000 | Kester | |
| 6,147,294 A | 11/2000 | Dailey et al. | |
| 6,177,627 B1 | 1/2001 | Murphy et al. | |
| 6,198,461 B1 | 3/2001 | Chieusse et al. | |
| 6,224,016 B1 | 5/2001 | Lee et al. | |
| 6,423,895 B1 | 7/2002 | Murphy et al. | |

(Continued)

FOREIGN PATENT DOCUMENTS

DE    2042091        3/1972
DE    10127292 A1    12/2002

(Continued)

OTHER PUBLICATIONS

PCT International Search Report mailed Apr. 7, 2009, for International Application No. PCT/US2008/082453.

(Continued)

*Primary Examiner* — Jonathan Johnson
*Assistant Examiner* — Lindsey Bernier
(74) *Attorney, Agent, or Firm* — TraskBritt

(57) ABSTRACT

A solar array including a solar array assembly, hub assembly, and wing assembly.

20 Claims, 20 Drawing Sheets

(56) References Cited

U.S. PATENT DOCUMENTS

| | | | |
|---|---|---|---|
| 6,555,740 | B2 | 4/2003 | Roth et al. |
| 6,624,351 | B2 | 9/2003 | Kular et al. |
| 6,637,702 | B1 | 10/2003 | McCandless |
| 6,689,952 | B2 | 2/2004 | Kawaguchi |
| 7,026,541 | B2 | 4/2006 | Heidrich |
| 7,301,095 | B2 | 11/2007 | Murphy et al. |
| 8,132,762 | B2 | 3/2012 | Huang |
| 8,664,511 | B2 | 3/2014 | Swatek et al. |
| 2003/0101565 | A1* | 6/2003 | Butler .............................. 29/428 |
| 2003/0167666 | A1* | 9/2003 | Close, Jr. ........................ 40/452 |
| 2004/0016454 | A1* | 1/2004 | Murphy et al. ................ 136/244 |
| 2006/0127648 | A1* | 6/2006 | De Luca ....................... 428/174 |

FOREIGN PATENT DOCUMENTS

| | | |
|---|---|---|
| EP | 1038464 A2 | 9/2000 |
| JP | 2002-154499 A | 5/2002 |
| JP | 2006-188201 A | 7/2006 |

OTHER PUBLICATIONS

White et al., "UltraFlex-175 on Space Technology 8 (ST8)—Validating the Next-Generation in Lightweight Solar Arrays" ATK Space Systems, 2006, pp. 7.

Eskenazi, et al., "Promising Results From Three NASA SBIR Solar Array Technology Development Programs", published 2005, pp. 59-94.

International Preliminary Report on Patentability, for International Application No. PCT/US2008/082453 dated May 25, 2010, 5 pages.

International Written Opinion, for International Application No. PCT/US2008/082453 dated Apr. 7, 2009, 4 pages.

* cited by examiner

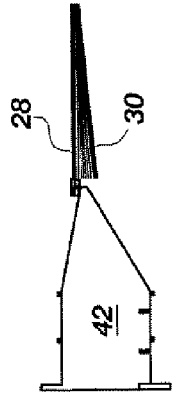
FIG. 25C
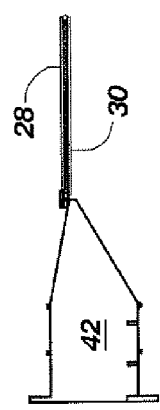
FIG. 25B
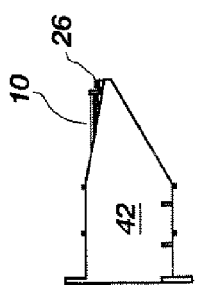
FIG. 25A
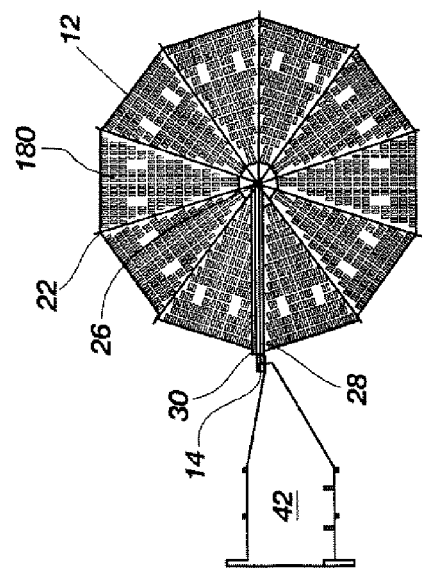
FIG. 25F
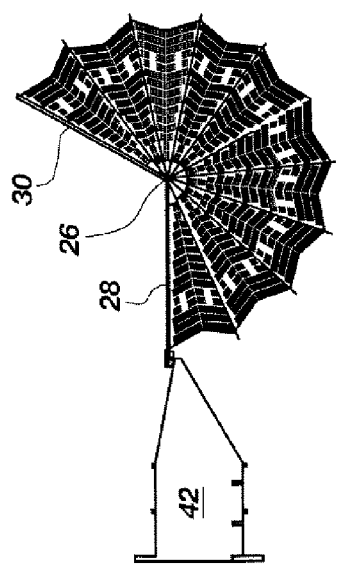
FIG. 25E
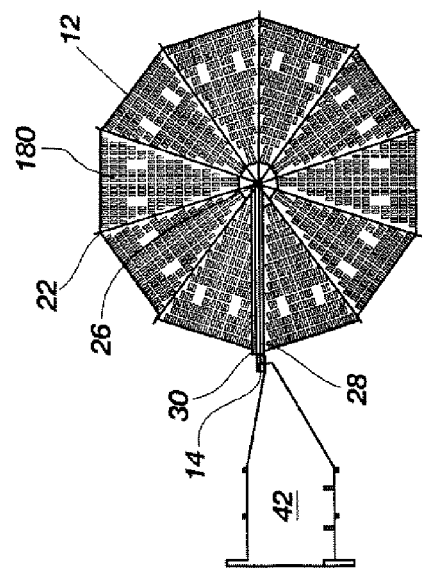
FIG. 25D
FIG. 25

SOLAR ARRAYS

This application is related to U.S. patent application Ser. No. 13/804,331, filed Mar. 14, 2013, for SOLAR ARRAYS, DEPLOYMENT MECHANISMS THEREFOR, AND RELATED METHODS.

BACKGROUND OF THE INVENTION

1. Field of the Invention

The present invention relates generally to solar arrays. More specifically, the present invention related to solar arrays for space craft that can be easily stowed during launch, have a minimal volume, and easily deployed to a desired size having a high degree of stiffness and stability.

2. Description of Related Prior Art

Solar arrays are used for space vehicles and satellites to generate current for power. The capacity of the solar array to produce current is directly related to the exposed surface area of the array having solar cells thereon. A solar array needs to be stowed during launch of the space vehicle or satellite occupying a minimum volume, having a minimum weight for subsequent deployment, and having a maximum surface area having solar cells thereon for current generation.

Solar arrays used for space vehicles need to achieve a high degree of stiffness and stability after deployment which runs counter to having a minimum volume and minimum weight when stowed for launch and deployment. Since a circular arrangement offers the maximum deployed area with the highest deployed stiffness, one type of solar array tends to be a multi-panel solar array having the general shape of a circle having triangular solar blankets, or gores, of the solar array being folded for deployment. In this manner, the gores can be supported and deployed about a hub being attached thereto by means of spars attached to brackets attached to the hub.

Alternatively, rectangular types of solar blankets may be used where the blanket is folded in an accordion arrangement for deployment between panels connected by a hinged pantograph or deployable boom deployment structure.

U.S. Pat. No. 5,296,044 to Harvey et al. describes a solar array deployable from a flat triangular structure to a substantially circular deployed shape. A static panel spar supports a hub having a plurality of intermediate spars rotating freely around the hub. A foldable gore is fitted between each pair of adjacent spars except between the static panel spar and the pivot panel. Rotation of the hub in one direction folds the gores into a stack. Rotation in the opposite direction opens the gores to form tensioned membranes between the spars.

U.S. Pat. No. 6,637,702 to McCandless describes a solar array including a plurality of panels that are individually supported by beams that nest within each other in the stowed position to minimize the volume of the structure. The beams are pivotally connected to each other being deployed by conventional means.

U.S. Pat. No. 6,423,895 to Murphy et al. describes a solar array including a blanket folded into adjacent panels that are hinged in an accordion-folded mode at parallel hinges. A pair of foldable spines is fixed to the panels and runs the length of the array. The hinges are included in the spine. The spines are mounted to a base plate attached to a space craft and to a tip plate. A pantograph deployment structure is used to retract and extend the blanket. A conductive harness is attached to the blanket to collect current from the panels.

U.S. Pat. No. 5,578,139 to Jones et al. describes a stowable and deployable concentrator for solar cells. A row of Fresnel lens elements is mounted to a substrate to be deflectable toward the substrate in a stowed configuration and biased away from it in the deployed configuration.

U.S. Pat. No. 6,624,351 to Kular et al. describes a folding photovoltaic strip device comprising a plurality of photovoltaic modules joined to form a strip and pleated by flexible, transverse creases so that the device may be stored folded together along the creases. The creases are sprung open to expose the modules to light.

U.S. Pat. No. 6,689,952 to Kawaguchi describes a membrane space structure deployed and spanned by centrifugal force owing to a spin motion. The structure includes a hub and a sail having plurality of petals attached to the hub by supports. Membranes are divided into suitable shapes where adjacent membranes are discretely connected to each other by bridge belts to suppress the residual crease strain. The petals may be connected to each other to help deployment.

U.S. Pat. No. 5,833,176 to Rubin describes a bowed solar array including panels that are connected by hinges. When stowed, the panels fold onto each other in an accordion fashion so that they occupy minimal volume in comparison to when the panels are deployed. A tensioning mechanism includes pulleys associated with the panels, and cables interconnecting the pulleys of the array. The bowed panels and tensioning mechanism are used to attempt to increase deployed stiffness.

SUMMARY OF THE INVENTION

A solar array including a solar array assembly, a hub assembly, and a wing assembly.

BRIEF DESCRIPTION OF THE DRAWINGS

The detailed description of the embodiments will be better understood when taken in conjunction with the drawings wherein:

FIG. 25 is a view of the deployment sequence of the solar array.

FIG. 25A is a view of the stowed position of the solar array on a space craft.

FIG. 25B is a view of the wing funned by the static panel spar, pivot panel, and solar array assembly when initial staging is complete.

FIG. 25C is a view of the release of the pivot panel from the static panel spar of the solar array.

FIG. 25D is a view of the pivot panel unfurling the solar array assembly from the static panel spar of the solar array about the hub assembly.

FIG. 25E is a view of the pivot panel unfurling the solar array assembly from the static panel spar of the solar array about the hub assembly.

FIG. 25F is a view of the deployed and latched position of the solar array.

DETAILED DESCRIPTION OF THE EMBODIMENTS

Figure 1:
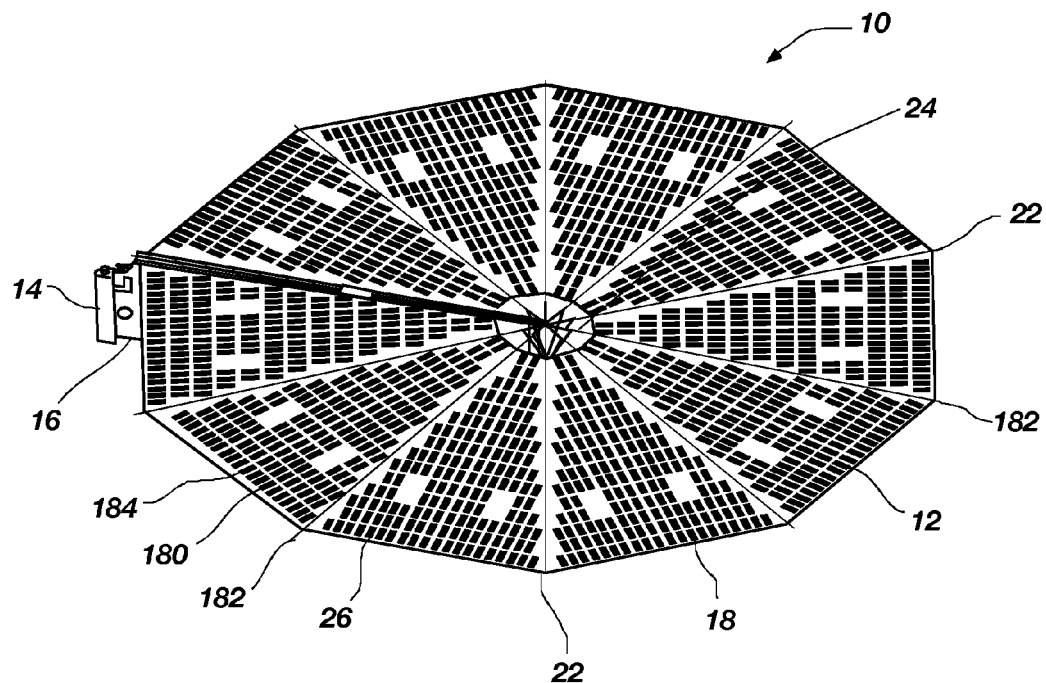
FIG. 1 is a view of the solar array deployed.

Referring to drawing FIG. 1, a solar array 10 is illustrated including a deployed solar array assembly 12, a base assembly 14, and a panel assembly 16. The solar array assembly 12 includes a plurality of triangular flexible blanket gore assemblies or gores 180 having solar cells 182 thereon attached to spars 22. The intermediate spars 22 are attached to y spar end fittings 88, 90, and 96 (FIG. 6) of hub assembly 26 which is mounted to an end of panel assembly 16.

Each solar array assembly 10 includes a triangular shaped gore 180 attached to intermediate spars 22. Each triangular shaped gore 180 includes a mid-flexure 184 about which the triangular shaped gore 180 folds in accordion fashion when the solar array assembly 12 is in its stowed position. Each triangular shaped gore 180 includes solar cells 182 thereon for the generation of current.

Figure 2:
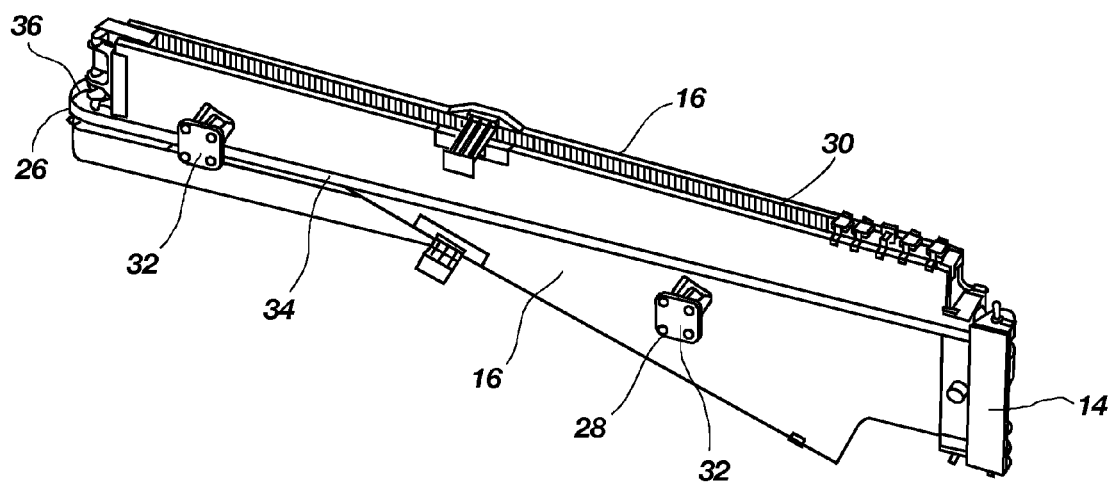
FIG. 2 is a view of the solar array forming a wing when in the stowed position.

Referring to drawing FIG. 2, the base assembly 14 is attached to an end of static panel spar 28 of the wing assembly 16 which includes pivot panel 30 which is, in turn attached to the static panel spar 28 by the hub assembly 26. The solar array assembly 12 (FIG. 1) is folded in an accordion fashion between the static panel spar 28 and pivot panel 30 of the spar assembly 16 in a stowed position where the solar array 10 occupies a minimum volume. Launch ties 32 hold the static panel spar 28 in position with respect to the pivot panel 30 in the stowed position. The launch ties 32 may be any suitable type tie, such as an explosively actuated device, to hold the static panel spar 28 to the pivot panel 30 until it is desired to deploy the solar array 10. A tape 34 extends from the base assembly 14, along the static panel spar 28, around the tape guide 36, and along the pivot panel 20 (not shown) being attached to the end thereof located adjacent the base assembly 14.

Figure 3:
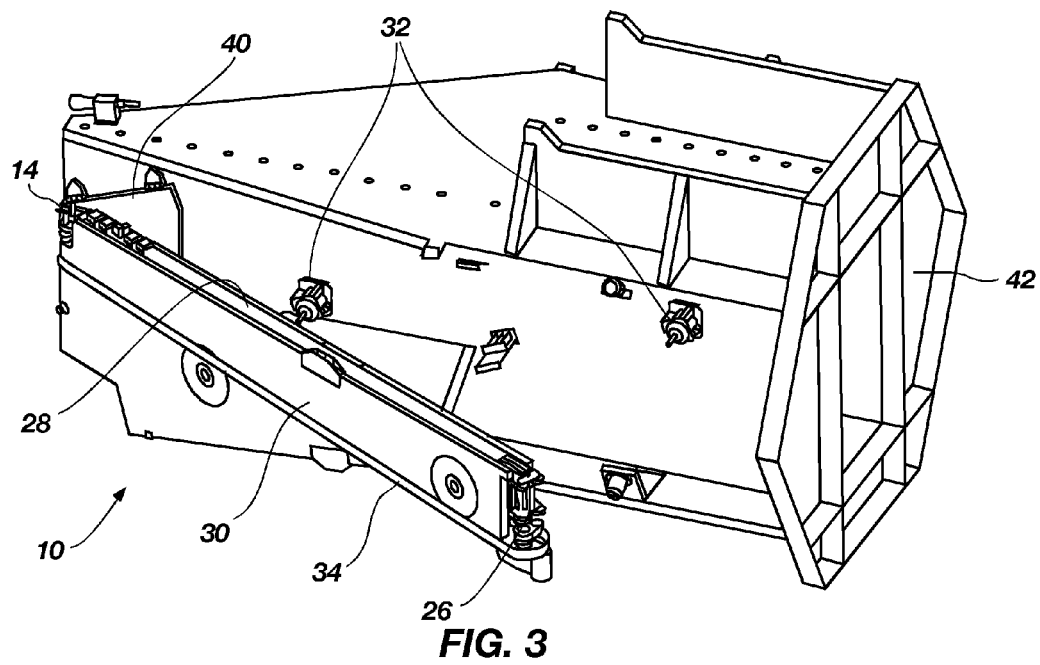
FIG. 3 is a view of the wing formed by the solar array mounted to a space craft after the initial release of the solar array from the stowed position.

Referring to drawing FIG. 3, the solar array 10 has base assembly 14 attached to a portion of a support 40 of a portion of a space craft 42 or other vehicle for which the solar array 10 is to supply electrical current for powering a space craft 42. The launch ties 32 are attached to a portion of the space craft 42 and have been actuated to release the static panel spar 28 and pivot panel 30 of panel assembly 16 of the solar array 10 from the space craft 42 for deployment.

Figure 4:
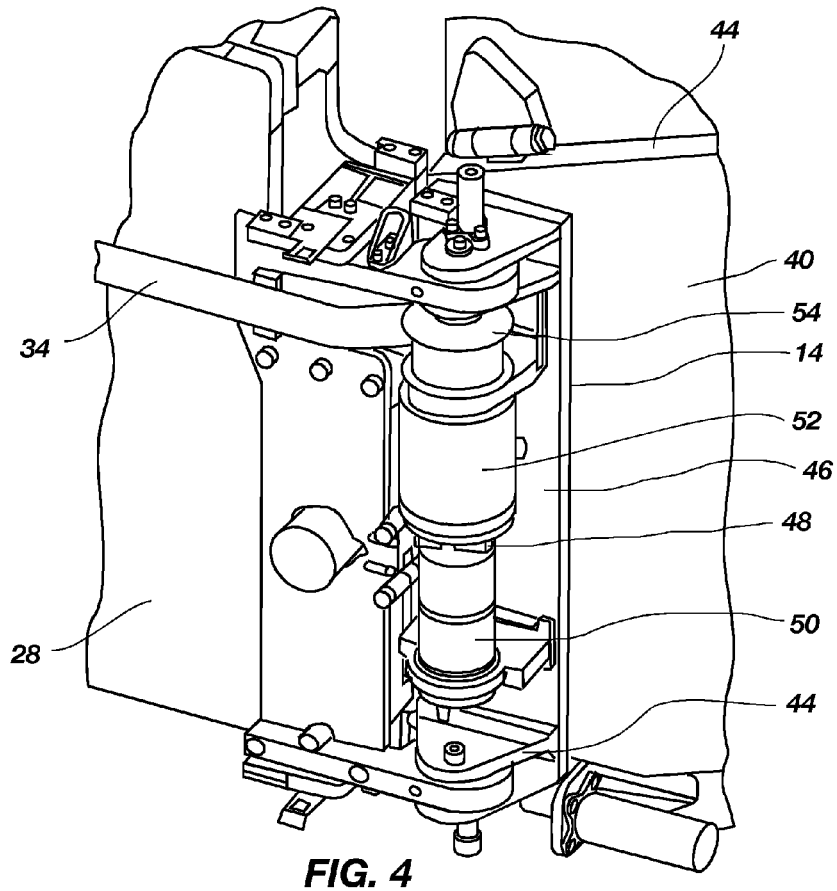
FIG. 4 is a view of the base assembly of the solar array.

Referring to drawing FIG. 4, the base assembly 14 is attached to a portion of support 40. The base assembly 14 includes hinges 44 having portions thereof attached to static panel spar 28 for the static panel spar 28 to pivot relative to base plate 46, which is attached to support 40 upon release by the launch ties 32 during deployment of the solar array 10. The base assembly 14 includes a stepper deployment motor 48 which drives tape pulley 52 having tape 34 connected thereto. Although only one tape 34 is illustrated, any desired number of tapes may be used, such as two or more tapes. The tape 34 comprises an ELIGILOY® tape available from Katy Industries, Inc., Arlington, Va. Further, if desired, another type of positive deployment member may be substituted for a tape that can be easily wound by the deployment motor 48. The deployment motor 48 may be any suitable type motor for use in the deployment of the solar array assembly 12 of the solar array 10. During deployment of the solar array assembly 12, the deployment motor 48 winds the tape 34 about tape pulley 54 to deploy the solar array assembly 12.

Figure 5:
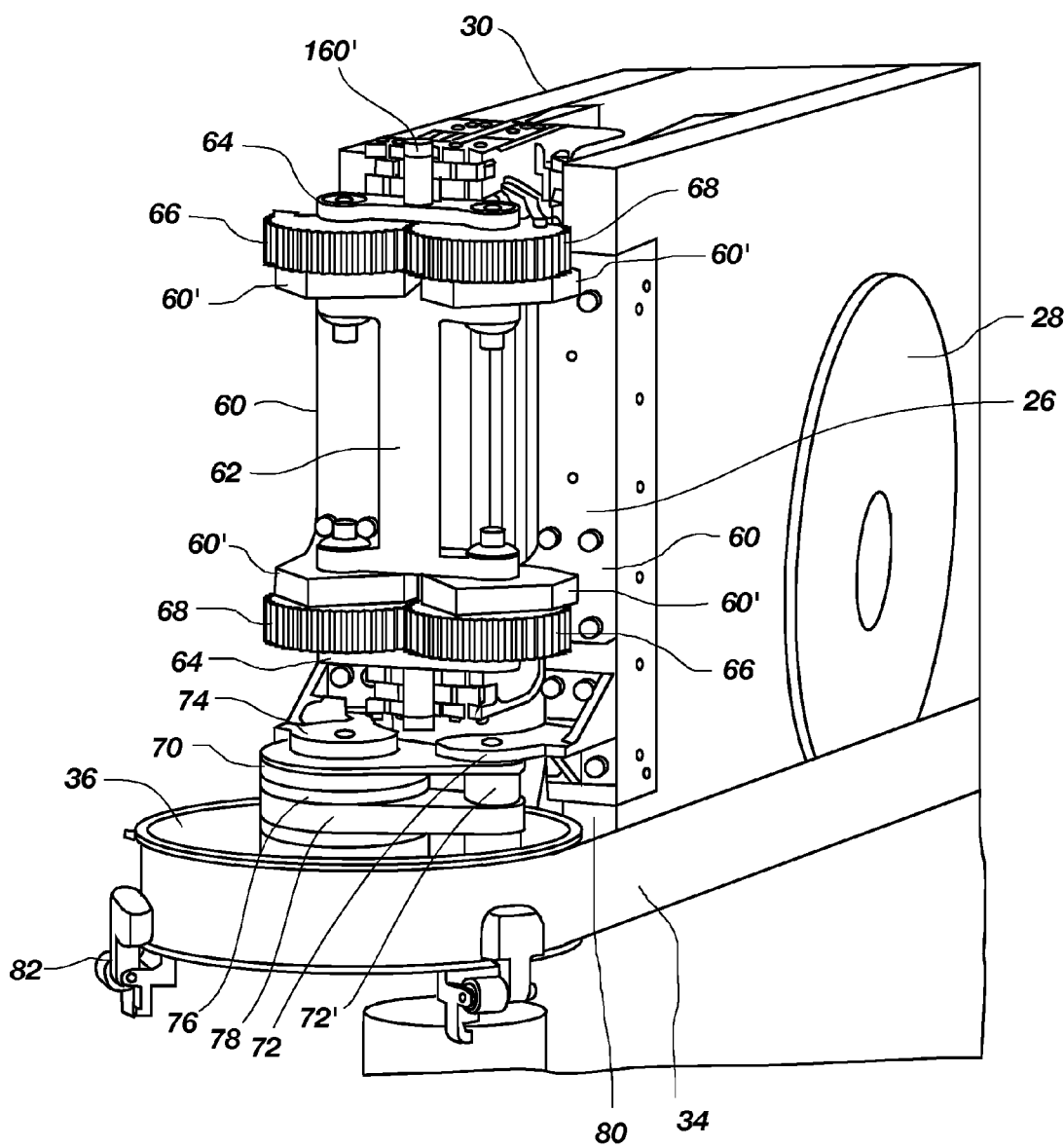
FIG. 5 is a view of the hub assembly of the solar array in a stowed arrangement.

Referring to drawing FIG. 5, the hub assembly 26 is attached to the outer ends of the static panel spar 28 and pivot panel 30 using hub brackets 60 having hub link 62 attached thereto. The hub brackets 60 are generally C-shaped having lugs 60' extending therefrom having any desired number of apertures therein for the mounting of other components of the hub assembly 26 thereto. The hub brackets 60 are attached to the ends of the static panel spar 28 and pivot panel 30 by any suitable fastening devices, such as threaded fasteners. The hub assembly 26 includes hub shaft mounts 64, upper and lower one piece timing gears 66, upper and lower split timing gears 68, brake assembly 70, and tape guide 36. The brake assembly 70 includes brake bracket 72 attached to an end of static panel spar 28, he bracket 72 having a post 72' attached thereto, brake bracket 74 attached to and end of pivot panel 30, brake member 76, and brake arm 78 extending between the brake member 76 and post 72' of brake bracket 72 to control the rate of movement of the pivot panel 30 relative to the static panel spar 28 during the deployment of the solar array assembly 12. The timing gears 66 and split timing gears 68 engage to provide alignment and timing of the static panel spar 28, pivot panel 30 and solar array assembly 12 during the deployment of the solar array assembly 12. The timing gears 66 and split timing gears 68 are each mounted on the static panel spar 28 and pivot panel 30 in an opposed arrangement. The timing gears 66 and 68 are generally semicircular in shape having suitable teeth on approximately 180° of the circumference thereof. The hub assembly 26 includes the tape guide 36 attached to static panel spar 28 by bracket 80 having keepers 82, of any suitable type, attached thereto having a portion thereof abutting a portion of the tape 34 for keeping the tape 34 engaging the tape guide 36 for deployment of the solar array assembly 12. The brake member 76 and brake arm 78 of the brake assembly 70 may be of any suitable type for use in controlling the relative movement of the pivot panel 30 relative to the static panel spar 28 as well as the rate of deployment of the solar array assembly 12 during the deployment of the solar array assembly 12.

The hub assembly 26 provides stability for the solar array assembly 12 during the deployment thereof. The hub assembly 26 enhances stiffness and stability of the hub area of the solar array 10 and the solar array assembly 12 by using simple actuation kinematics which, in turn, increases the reliability of the deployment of the solar array assembly 12.

The hub assembly 26 allows the separation of the hub assembly 26 from the solar array assembly 12 thereby allowing for the separate assembly and installation of such components which, in turn, provides for fewer problems and damage of components during assembly and testing of the solar array 10. By separating the hub assembly 26 and solar array assembly 12, the hub assembly 26 can be assembled and tested with the base assembly 14 on the static panel spar 28 and pivot panel 30 while the solar array assembly 12 can be assembled and tested separately. Then the solar array 10 can be assembled and tested as a completed assembly as to function and performance thereof in an assembled fashion.

The hub assembly 26 benefits from relocating the timing gears 66 and split timing gears 68 as well as the watchband connections 140 formed of the clevis 130 of spar end fittings 88, 96 and mating links 132 located outside the hub brackets 60 and hub link 62, thereby creating a more stable structure having a minimum volume and mass. By such relocation and separation through the use of spar end fittings 88, 96 and spar end fittings 90 (FIG. 6), the use of lower spar struts 190 (see FIG. 17) is facilitated resulting in an increased structural load capacity, greater triangulation of the support of the intermediate spars 22, and overall stiffness of the solar array 10.

The use of the hub brackets 60, hub link 62, and the hub shafts 586 allows the timing gears 66 and split timing gears 68 as well as the hub shafts 586 to be held in double shear loading arrangement thereby resulting in relatively free unrestrained motion in a single degree of rotating freedom of movement for the hub assembly 26.

Figure 6:
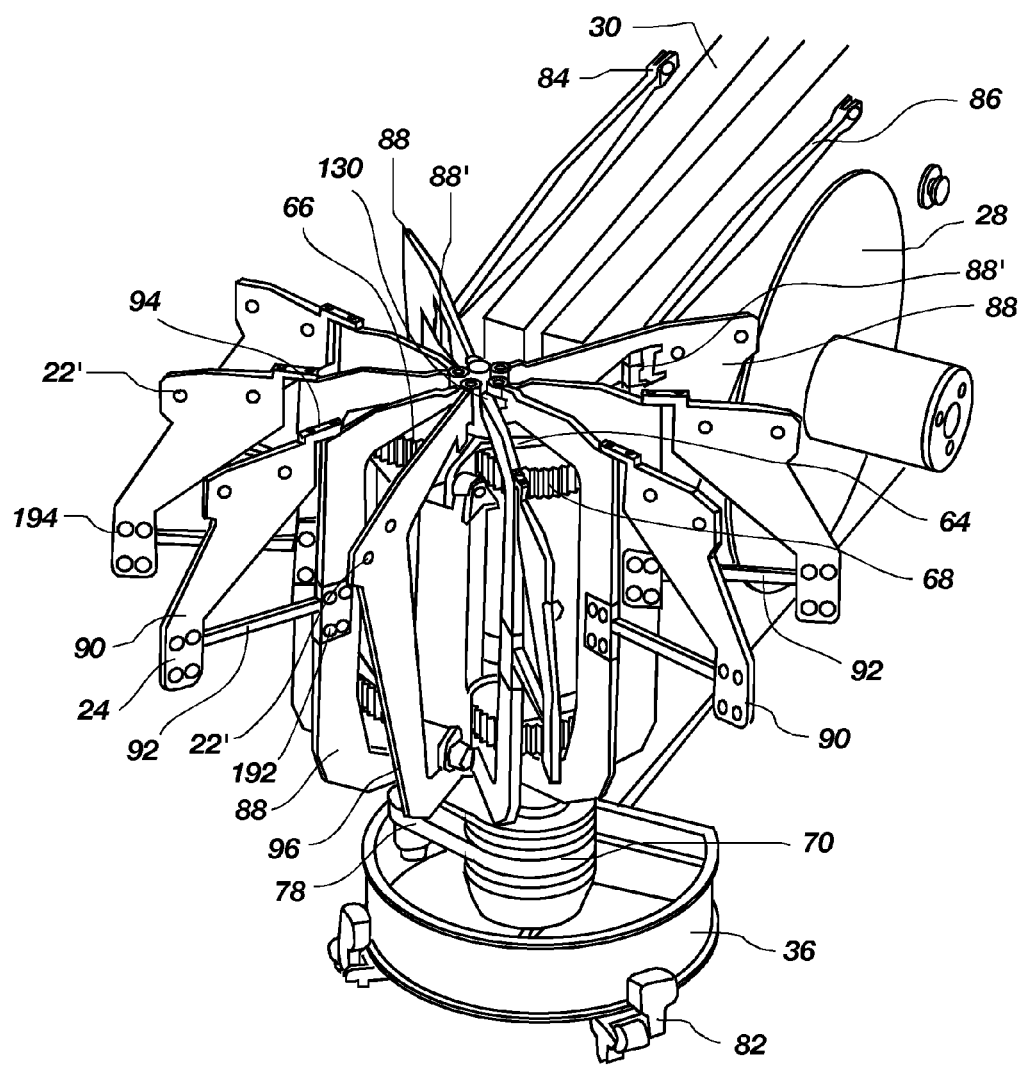
FIG. 6 is a view of portions of the hub assembly in a deployed arrangement.

Referring to drawing FIG. 6, the solar array assembly 12 (see FIG. 1) includes deployment link 84 attached to static panel spar 28 (shown as unattached) and pivotally mounted to a spar end fitting 88 using a suitable threaded fastener 88', deployment link 86 attached to pivot panel 30 (shown as unattached) and pivotally mounted to a spar end fitting 88 using a suitable threaded fastener 88', a plurality of C-shaped links or spar end fittings 88, a plurality of spar flexure end fittings 90, a plurality of spar flexures 92 extending between and attached to spar end fittings 88 and spar flexures 92, a plurality of flexure locks 94 attaching the spar end fittings 88 to the spar end fittings 90 prior to launch of the space craft, and non-flexure spar end fitting 96. The upper and lower ends of the spar end fittings 88 are connected by a watch band connection 140 (see FIG. 10) of a link and clevis arrangement, while the non-flexure spar end fitting 96 further includes a lug (not shown) for attachment of upper and lower hub shaft mounts 64 of the hub brackets 60.

The spar end fitting 88 includes a plurality of holes 192 therein for the attachment of one end of spar support strut 190 thereto using any suitable type of fastener, such as a threaded fastener. Spar flexures 92 include a plurality of holes 22' therein for the attachment of one end of intermediate spars 22 therein using any suitable type of fastener such as a threaded fastener, and include a plurality of holes 194 therein for the attachment of one end of spar support strut 190 thereto using any suitable type of fastener, such as a threaded fastener. Non-flexure spar fitting 96 includes a plurality of holes 22' therein for the attachment of one end of intermediate spars 22 therein using any suitable type of fastener, such as a threaded fastener.

Figure 6A:
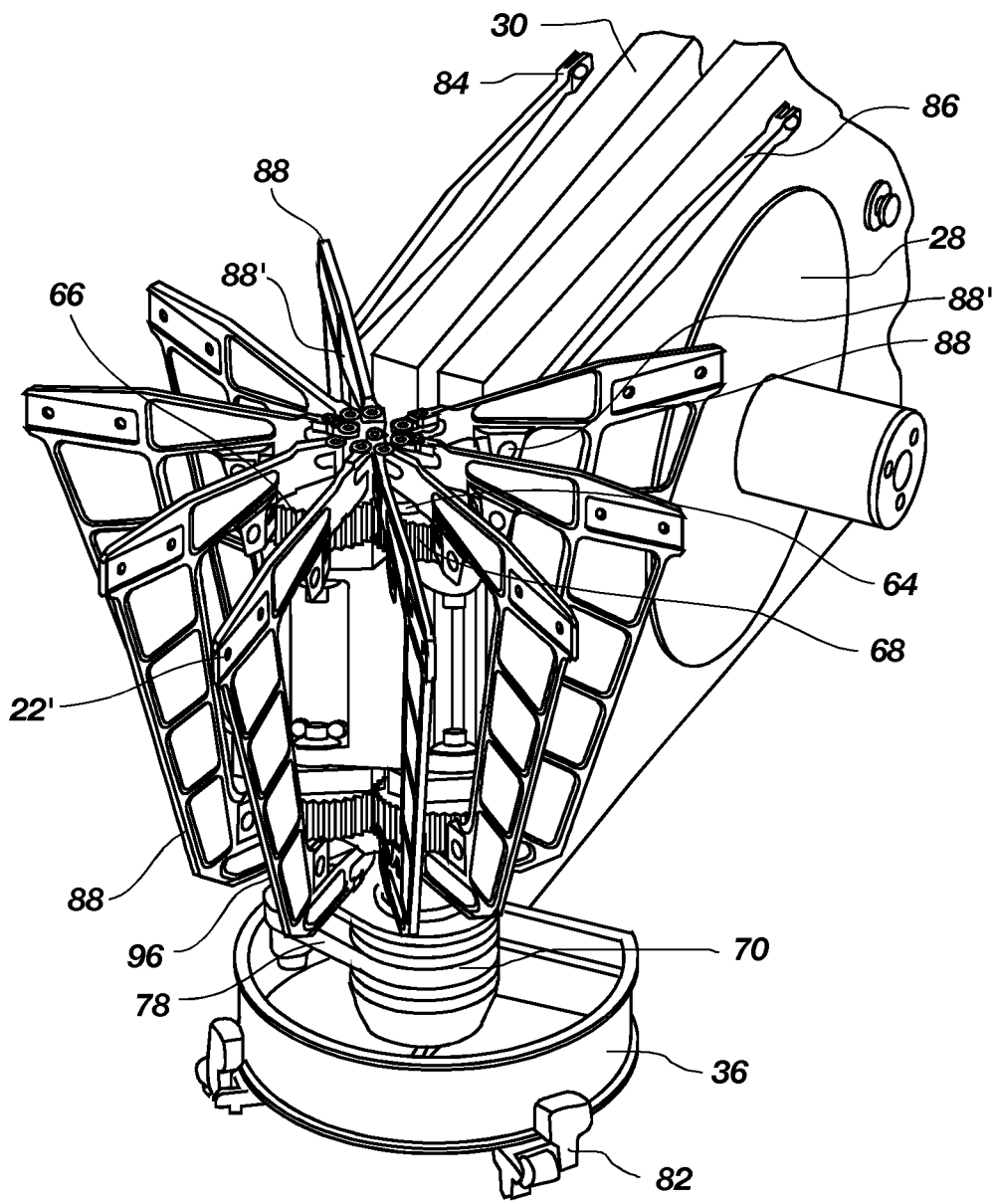
FIG. 6A is a view of portions of the hub assembly of another embodiment in a deployed arrangement.

Referring to drawing FIG. 6A, another embodiment of the solar array assembly 12 includes deployment link 84 attached to static panel spar 28 (shown as unattached) and pivotally mounted to a spar end fitting 88 using a suitable threaded fastener 88', deployment link 86 attached to pivot panel 30 (shown as unattached) and pivotally mounted to a spar end fitting 88 using a suitable threaded fastener 88', and a plurality of C-shaped links or spar end fittings 88. The upper and lower ends of the spar end fittings 88 are connected by a watch band connection 140 of a link and clevis arrangement, while the non-flexure spar end fitting 96 further includes a lug (not shown) for attachment of upper and lower hub shaft mounts 64 of the hub brackets 60 (see FIG. 8).

The spar end fitting 88 includes a plurality of holes 192 therein for the attachment of one end of spar support strut 190 thereto using any suitable type of fastener, such as a threaded fastener. Non-flexure spar fitting 96 includes a plurality of holes 22' therein for attachment of one end of intermediate spars 22 therein using any suitable type of fastener, such as a threaded fastener. In this embodiment, the spar flexure end fittings 90, plurality of spar flexures 92 extending between and attached to spar end fittings 88 and spar flexures 92, and plurality of flexure locks 94 attaching the spar end fittings 88 to the spar flexure end fittings 90 prior to launch of the space craft are eliminated for added rigidity of the solar array 10 when deployed.

Figure 7:
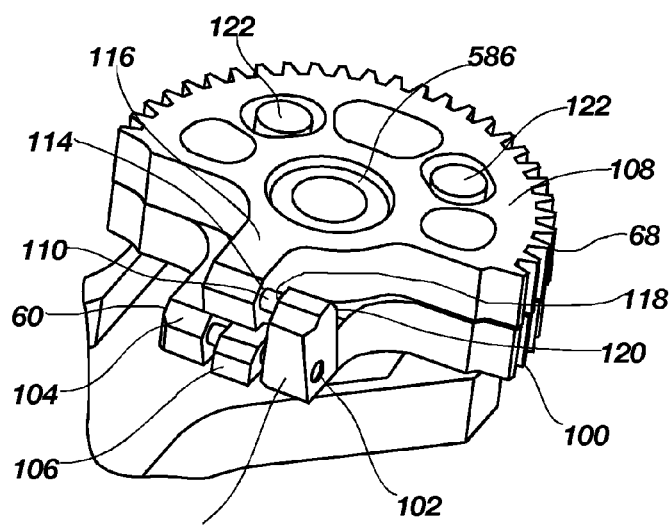
FIG. 7 is a view of the split timing gears of the solar array.

Referring drawing FIG. 7, the split gears 68 are attached by lower split gear 100 having a pin 102 extending from the ears 104 through a lug 106 extending from hub bracket 60, while upper gear 108 of the split gears 68 has a pin 110 extending between an aperture 114 in the lug 116 of upper gear 108 and an aperture 118 in lug 120 extending upwardly from lower gear 100. In this manner, the upper split gear 108 is free to move relative to the lower split gear 100 during assembly of the various components of the solar array 12. When the desired alignment of the split gears 100 and 108 is achieved during assembly of the solar array assembly 12, the split gears 68 are held in the desired position by set screws or threaded fasteners 122 which engage threaded apertures in hub brackets 60 attached to static panel spar 28 and pivot panel 30.

The use of split gears 100 and 108 allows increased gear backlash adjustment at the start and end of deployment of the solar array 10, making tolerances of gear location in the hub assembly 26 less critical and easier to maintain. The increased gear backlash adjustment allows for better alignment of the solar panels of the solar array assembly 12 throughout the deployment of the solar array 10 as the alignment can be set to a desired amount during assembly of the solar array 10 avoiding expensive precision, high tolerance parts forming the solar array 10 and the use of shims during assembly to achieve the desired alignment of the various components of the solar array 10.

Figure 8:
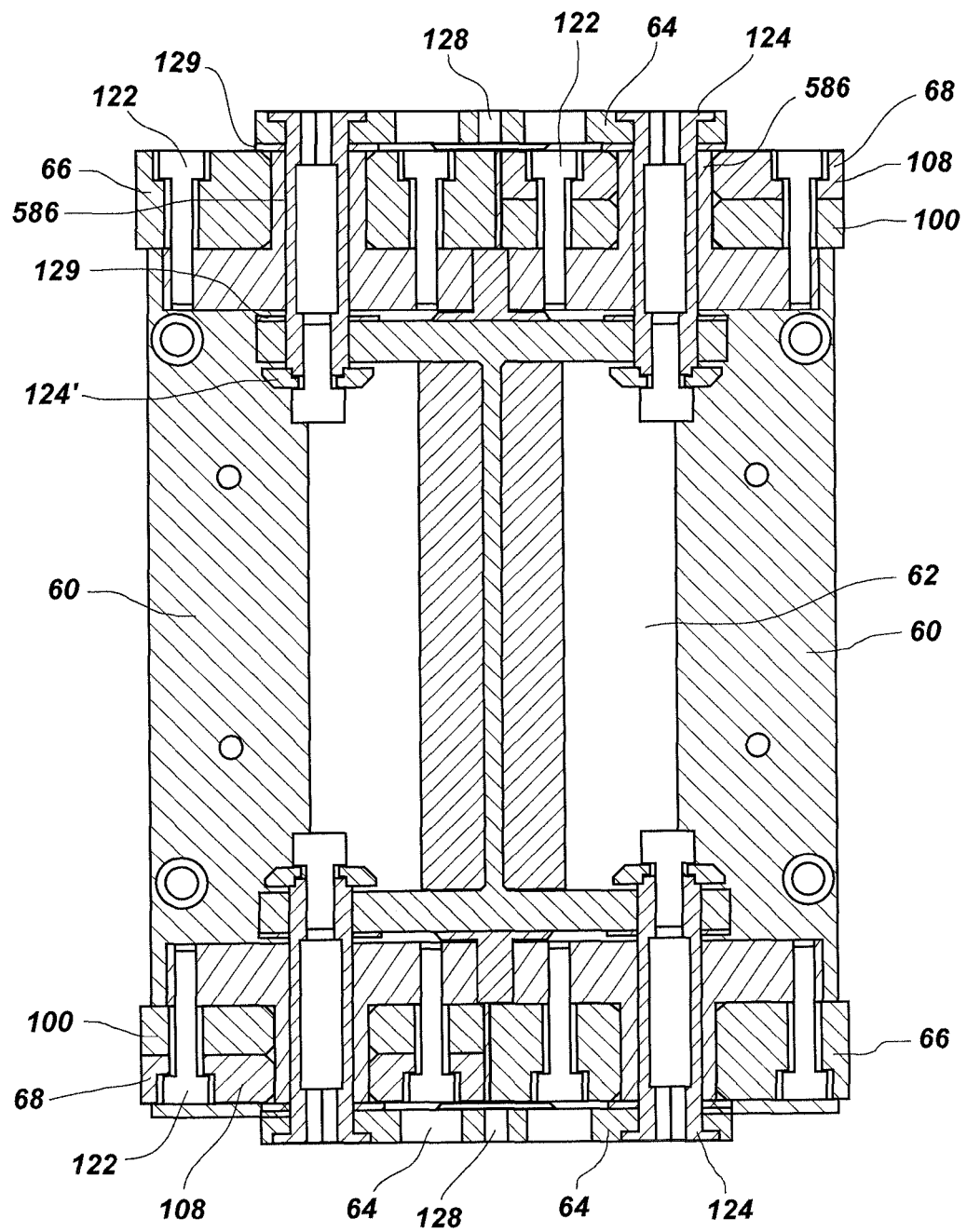
FIG. 8 is a view in partial cross-section of the hub brackets, hub link, and timing gears of the solar array.

Referring to drawing FIG. 8 the mounting of the gears 66 and split timing gears 68 on the hub brackets 60 in relation to the hub link 62 are shown in cross-section. The hub link 62 is secured to the hub brackets 60 by suitable threaded members 124 extending from hub link 62, through hub brackets 60, and through upper and lower hub shaft mounts 64, each crossmember having apertures 128 therethrough to secure the non-flexure spar end fitting 96 (FIG. 6) thereto using a threaded fastener (not shown). The threaded fasteners 122 are used to secure both gears 66 and split timing gears 68 to the hub brackets 60. Shims 129 and retainers 124' are provided with the threaded members 124.

Figure 8A:
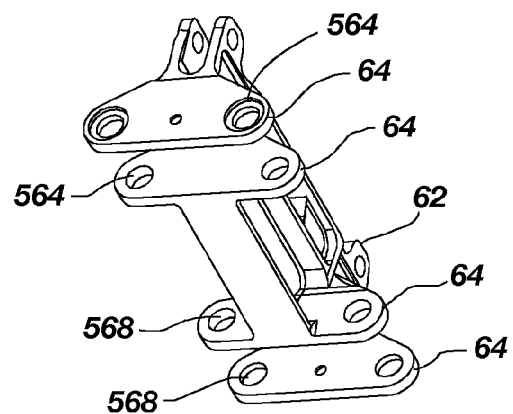
FIG. 8A is a view of a hub link of the solar array.

Referring to drawing FIG. 8A, the front of hub link 62 includes upper hub shaft mounts 64 having apertures 564 therethrough for receiving portions of threaded fasteners 122 (FIG. 8) therethrough and lower hub shaft mounts 64 having apertures 564 for receiving portions of threaded fasteners 122 (FIG. 8) therethrough.

Figure 8B:
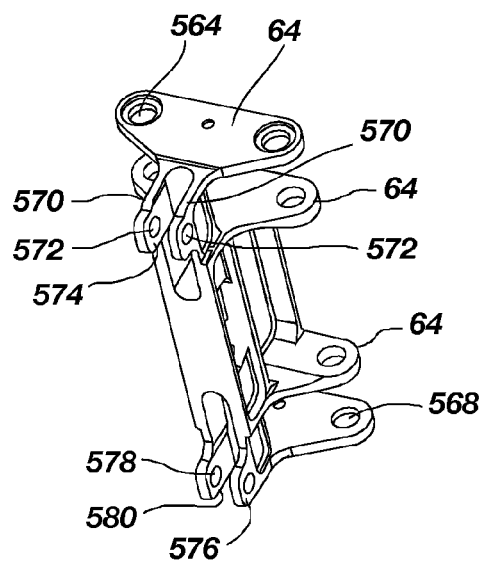
FIG. 8B is a view of a hub link of the solar array.

Referring to drawing FIG. 8B, the back of hub link 62 includes shaft mounts 64 having apertures 572 therethrough forming a slot 574 therebetween and lower ears 576 having apertures 578 therethrough forming a slot 580 therebetween. The slots 574 and 580 receive lugs 138 (FIG. 9) of spar end fitting 96 (FIG. 6) therein for suitable threaded fasteners (not shown) to secure the spar end fitting 96 to the hub link 62.

Figure 8C:
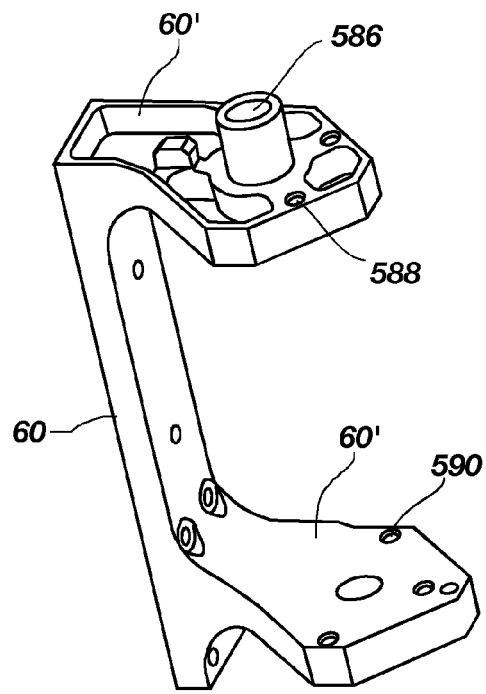
FIG. 8C is a view of the hub bracket of the solar array.

Referring to drawing FIG. 8C, a hub bracket 60 comprises a generally C-shaped member having upper lug 60' extending from the upper end thereof and lower lug 60' extending from the lower end thereof. The upper lug 60' is formed having a hub shaft 586 extending therefrom for the mounting of timing gear 66 (See FIG. 7) or split timing gears 68 (See FIG. 7) thereon and apertures 588 to receive portions of threaded fasteners 122 (See FIG. 7) therein while lower lug 60' is formed having a boss (not shown) similar to shaft 586 thereon for the mounting of timing gear 66 (See FIG. 7) or split timing gears 68 (See FIG. 7) thereon and apertures 590 to receive portions of threaded fasteners 122 therein (See FIG. 7).

Figure 9:
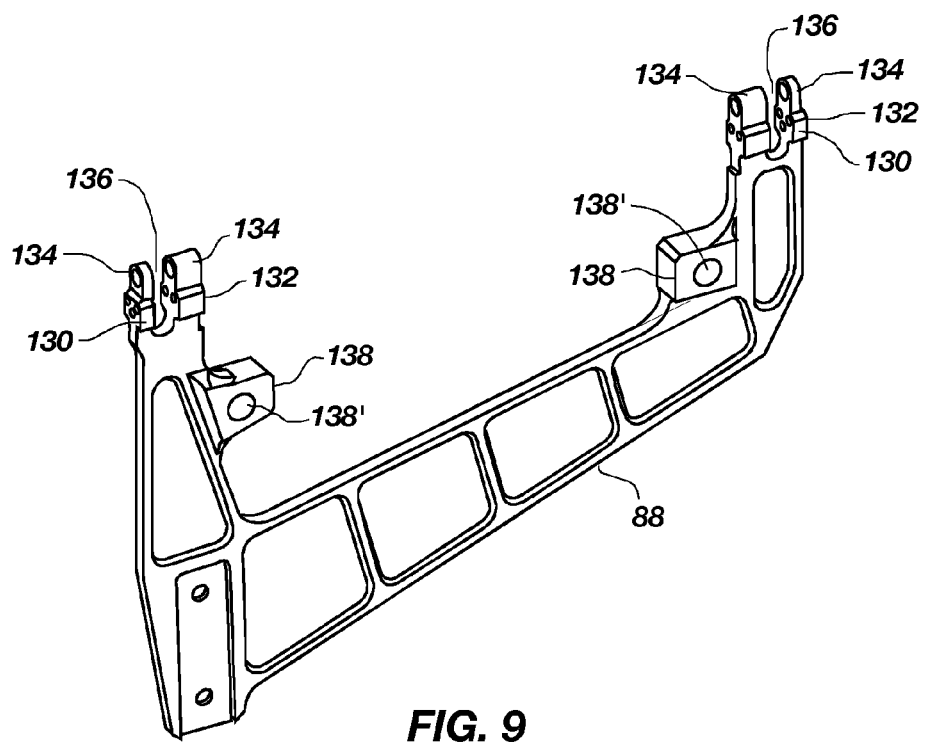
FIG. 9 is a view of a spar end fitting of the solar array.

Referring to drawing FIG. 9, a spar end fitting 88 is shown having a clevis 130 formed on each end thereof. Each clevis 130 having mating links 132 for watch band pins (not shown) to be received therein, an aperture 134 for a threaded fastener to be received therein (not shown), and a slot 136 formed on the end of the spar end fitting 88. The spar end fitting 88 may be used as non-flexure spar end fitting 96 (FIG. 6) for the lugs 138 having apertures 138' therethrough to be connected to lugs.

Figure 10:
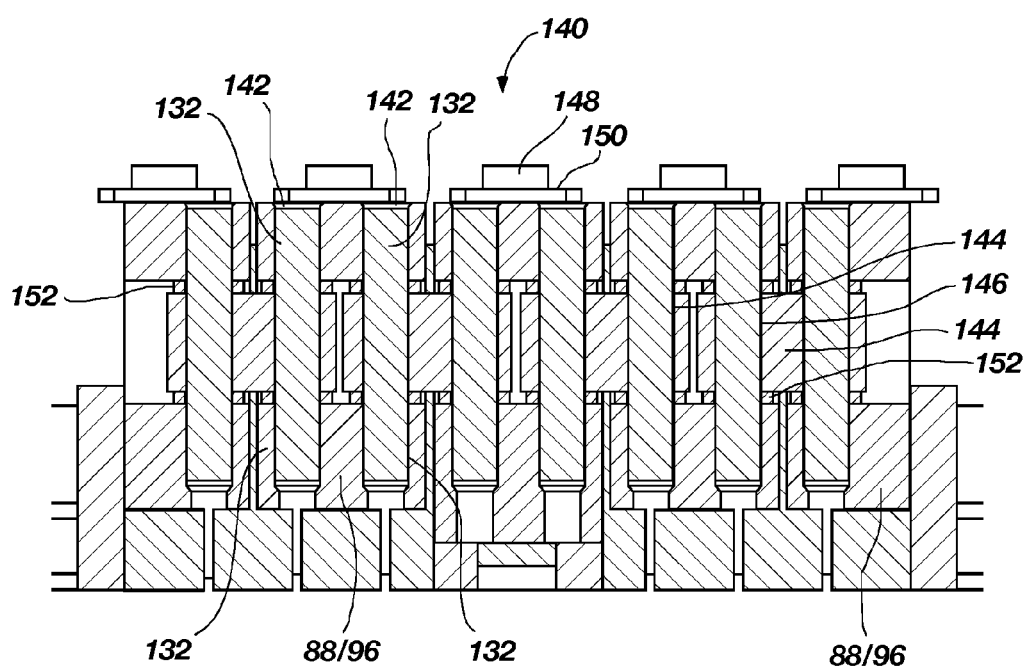
FIG. 10 is a cross section view of the watchband link arrangement of the solar array connecting the upper and lower ends of the spar end fittings.

Referring to drawing FIGS. 10, shown in cross-section, is the watch band connection 140 of the link and clevis arrangement of the upper and lower ends of the spar end fittings 88 and non-flexure spar end fittings 96 (FIG. 6), which includes a lug (not shown) for attachment to upper and lower hub shaft mounts 64 which, in turn, are secured to the hub brackets 60. Each end of spar end fitting 88 or non-flexure spar end fitting 96 contains mating links 132 having watch band pins 142 located therein which extend through apertures 146 in links 144. The watch band pins 142 are held in position in the clevis 130 by washer 150 extending over a portion thereof being engaged by the head of a threaded fastener 148 extending through the aperture 134 (see FIG. 9) in an end of spar end fitting 88 or non-flexure spar end fitting 96 being suitably retained therein. The links 144 are axially spaced in the clevis 130 by using axial spacers 152 (suitable washers) on either side of the links 144. In this manner, the of spar end fittings 88 or non-flexure spar end fitting 96 are connected in a watch band fashion through the use of a clevis 130 on each end of a spar and the use of watch band pins 142 engaging portions of clevis 130 on an end of spar end fitting 88 or non-flexure spar end fitting 96 and engaging portions of links 144 forming the watch band connection 140.

Referring to drawing FIG. 10, shown in cross-section is the watch band connection 140 of the link and clevis arrangement of the upper and lower ends of the spar end fittings 88 and non-flexure spar end fittings 96 (FIG. 6) which includes a lug (not shown) for attachment to upper and lower hub shaft mounts 64 which, in turn, are secured to the hub brackets 60. Each end of spar end fitting 88 or non-flexure spar end fitting 96 contains mating links 132 having watch band pins 142 located therein which extend through apertures 146 in links 144. The watch band pins 142 are held in position in the clevis 130 by washer 150 extending over a portion thereof being engaged by the head of a threaded fastener 148 extending through the aperture 134 (see FIG. 9) in an end of spar end fitting 88 or non-flexure spar end fitting 96 being suitably retained therein. The links 144 are axially spaced in the clevis 130 by using axial spacers 152 (suitable washers) on either side of the links 144. In this manner, the of spar end fittings 88 or non-flexure spar end fitting 96 are connected in a watch band fashion through the use of a clevis 130 on each end of a spar and the use of watch band pins 142 engaging portions of clevis 130 on an end of spar end fitting 88 or non-flexure spar end fitting 96 and engaging portions of links 144 forming the watch band connection 140.

Figure 11:
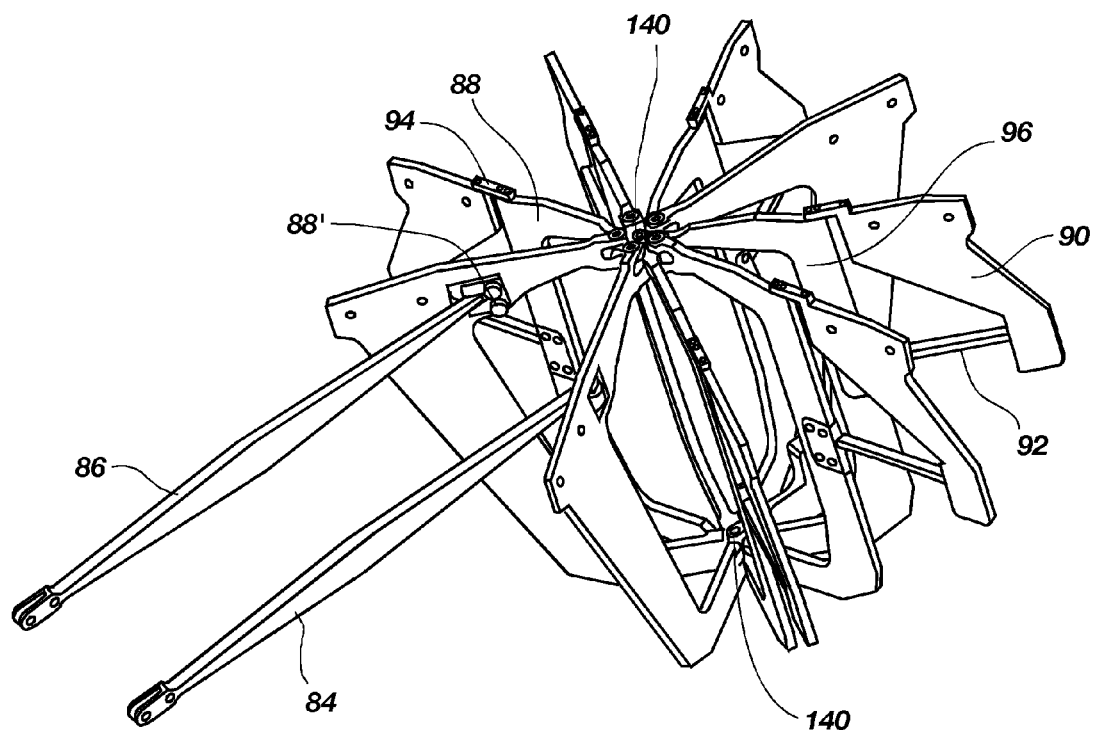
FIG. 11 is a view of the spar end fittings of the solar array in a fully deployed position.

Referring to drawing FIG. 11, in a fully deployed position, the deployment link 84 is connected to static panel spar 28 (not shown) and pivotally mounted to a spar end fitting 88 using a suitable threaded fastener 88', deployment link 86 attached to pivot panel 30 (not shown) and pivotally mounted to a spar end fitting 88 using a suitable threaded fastener 88', a plurality of C-shaped links or spar end fittings 88, and non-flexure spar end fitting 96. The upper and lower ends of the spar end fittings 88 are connected by a watch band connection 140 of the link and clevis arrangement, while the non-flexure spar end fitting 96 further includes a lug (not shown) for attachment of upper and lower hub shaft mounts 64 (not shown) which, in turn, are secured to the hub brackets 60 (not shown).

Figure 11A:
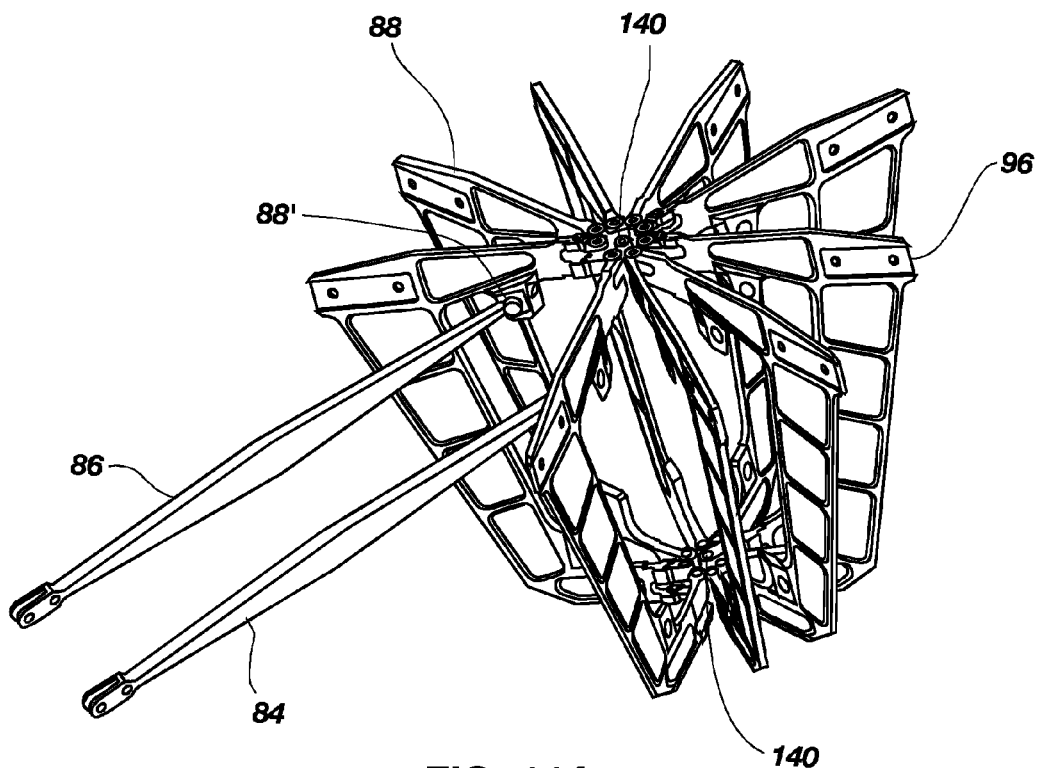
FIG. 11A is a view of another embodiment with the spar end fittings of the solar array in a fully deployed position.
Figure 12A:
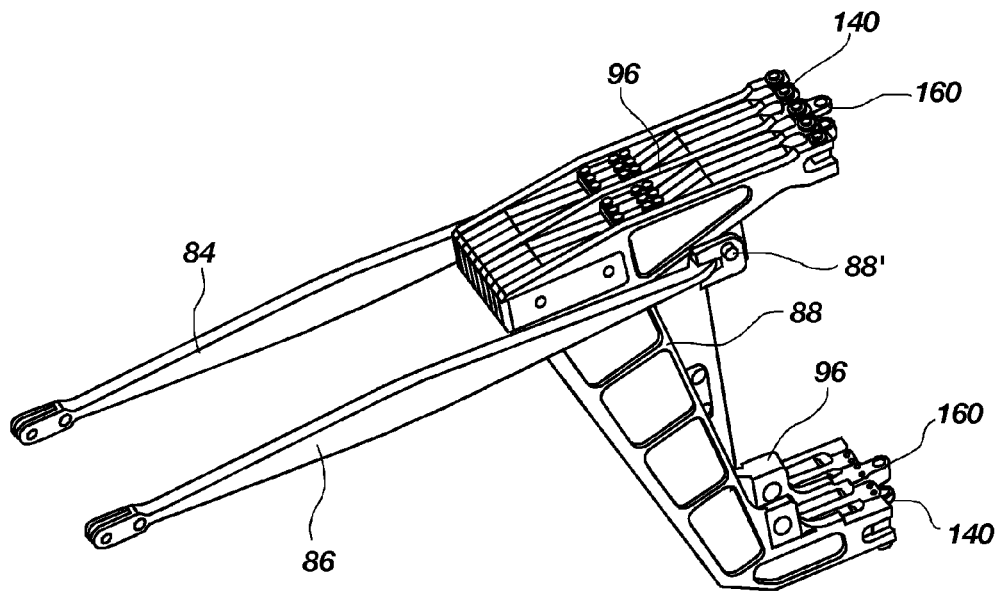
FIG. 12A is a view of another embodiment with the spar end fittings of the solar array in a stowed position.

Referring to drawing FIG. 11A, in a fully deployed position, the deployment link 84 connected to static panel spar 28 (not shown) and pivotally mounted to a spar end fitting 88 using a suitable threaded fastener 88', deployment link 86 attached to pivot panel 30 (not shown) and pivotally mounted to a spar end fitting 88 using a suitable threaded fastener 88', a plurality of C-shaped links or spar end fittings 88, and non-flexure spar end fitting 96. The upper and lower ends of the spar end fittings 88 are connected by a watch band connection 140 of the link and clevis arrangement, while the non-flexure spar end fitting 96 further includes a lug (not shown) for attachment of upper and lower hub shaft mounts 64 (not shown) which, in turn, are secured to the hub brackets 60 (not shown).

Figure 12:
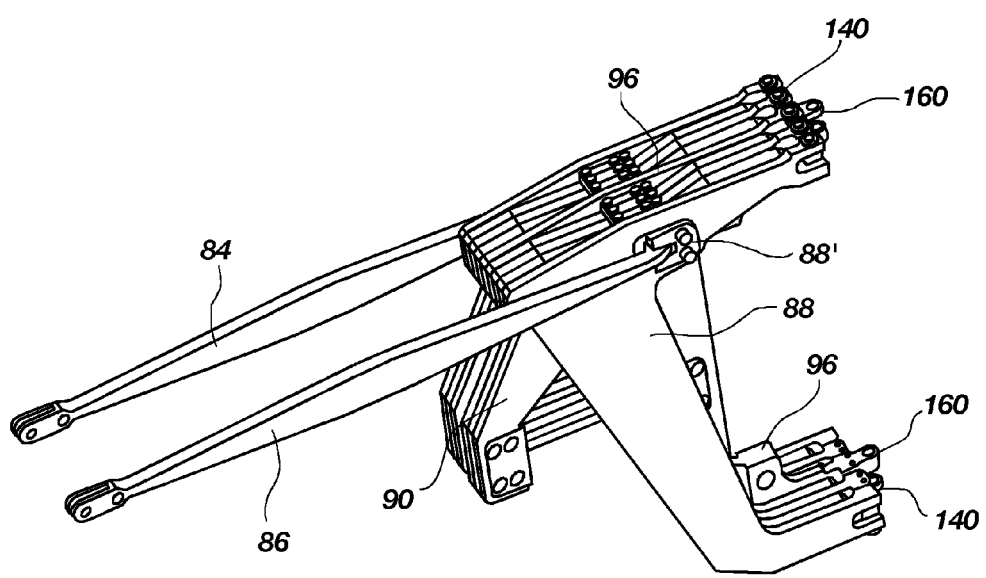
FIG. 12 is a view of the spar end fittings of the solar array in a stowed position.

Referring to drawing FIG. 12, in a fully stowed position are the deployment link 84 connected to static panel spar 28 (not shown) and pivotally mounted to a spar end fitting 88 using a suitable threaded fastener 88', deployment link 86 attached to pivot panel 30 (not shown) and pivotally mounted to a spar end fitting 88 using a suitable threaded fastener 88', a plurality of C-shaped links or spar end fittings 88, and non-flexure spar end fitting 96. The upper and lower ends of the spar end fittings 88 are connected by a watch band connection 140 of the link and clevis arrangement while the non-flexure spar end fitting 96 further includes a lug 160 for attachment to upper and lower hub shaft mounts 64 (not shown) which, in turn, are secured to the hub brackets 60 (not shown) using a suitable threaded fastener 160' (See FIG. 5).

Figure 13:
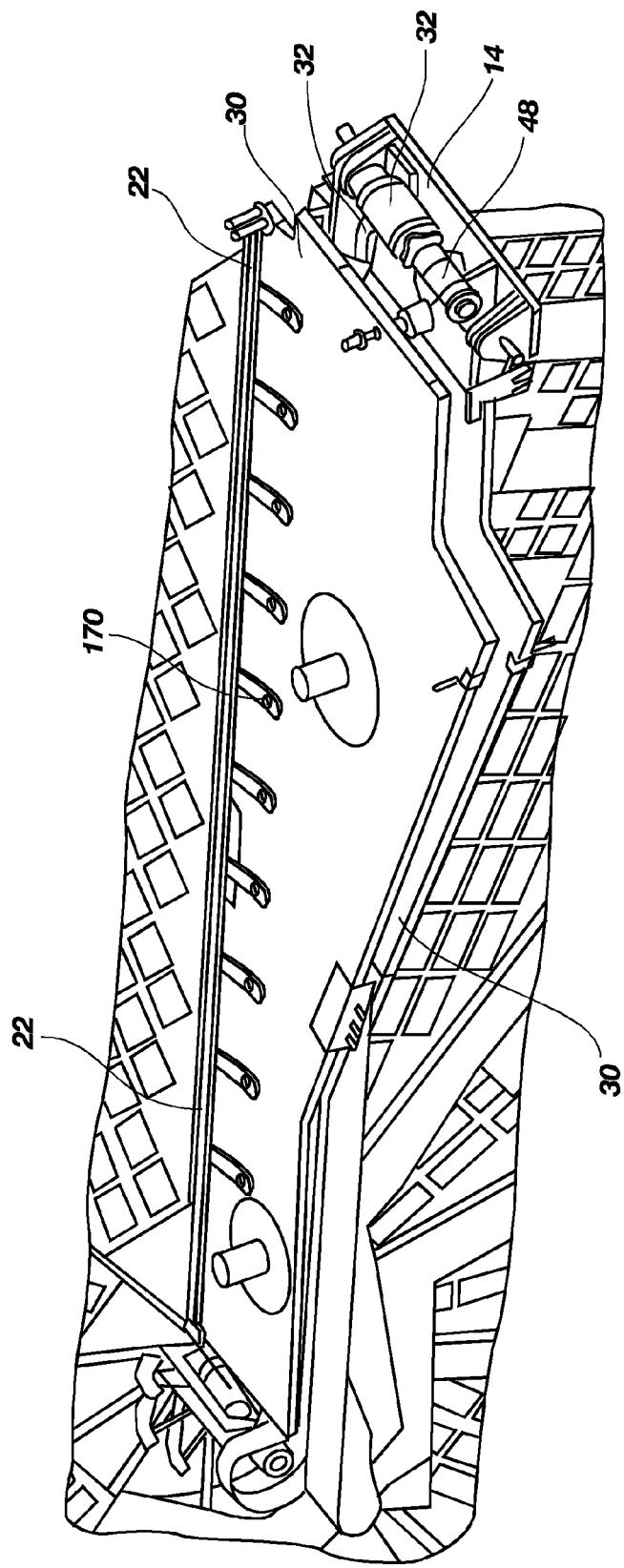
FIG. 13 is a view of the pivot panel and an intermediate spar having springs located therebetween.

Referring to drawing FIG. 13, the pivot panel 30 includes a plurality of flat flexure leaf spring elements 170 having one end secured thereto using any suitable fastener while the other end thereof is secured to an intermediate spar 22 connected to the pivot panel 30 by deployment link 86 (FIG. 12). The leaf springs 170 have a portion thereof abutting pivot panel 30 and intermediate spar 22 of the solar array assembly 12 (FIG. 1) when the solar array 12 is deployed. When the solar array assembly 12 is fully deployed, typically the last 2 degrees of the deployment thereof, the flat flexure leaf spring elements 170 deflect and introduce a known, predetermined, in-plane tension into the gores 180 (FIG. 1) of the deployed solar array assembly 12. Two sets of flat flexure leaf spring elements 170 are used, one set attached to the static panel spar 28 (FIG. 2) and one set to the pivot panel 30, both mounted in the same manner. During the unfurling deployment motion of the solar array assembly 12, the flat flexure leaf spring elements 170 are free to sweep (rotate in an arc) to follow initial static panel spar 28 and pivot panel 30 via a suitable rotating attachment to the spar. The flat flexure leaf spring elements 170 can be stacked together to allow tuning of the deployed gore tension of the solar array assembly 12 to any desired predetermined level. The flat flexure leaf spring elements 170 are designed to work in a substantially constant load-deflection regime so the gore tension of the solar array assembly 12 remains substantially constant throughout the load-deflection regime whenever the solar array assembly 12 is deployed.

Figure 14:
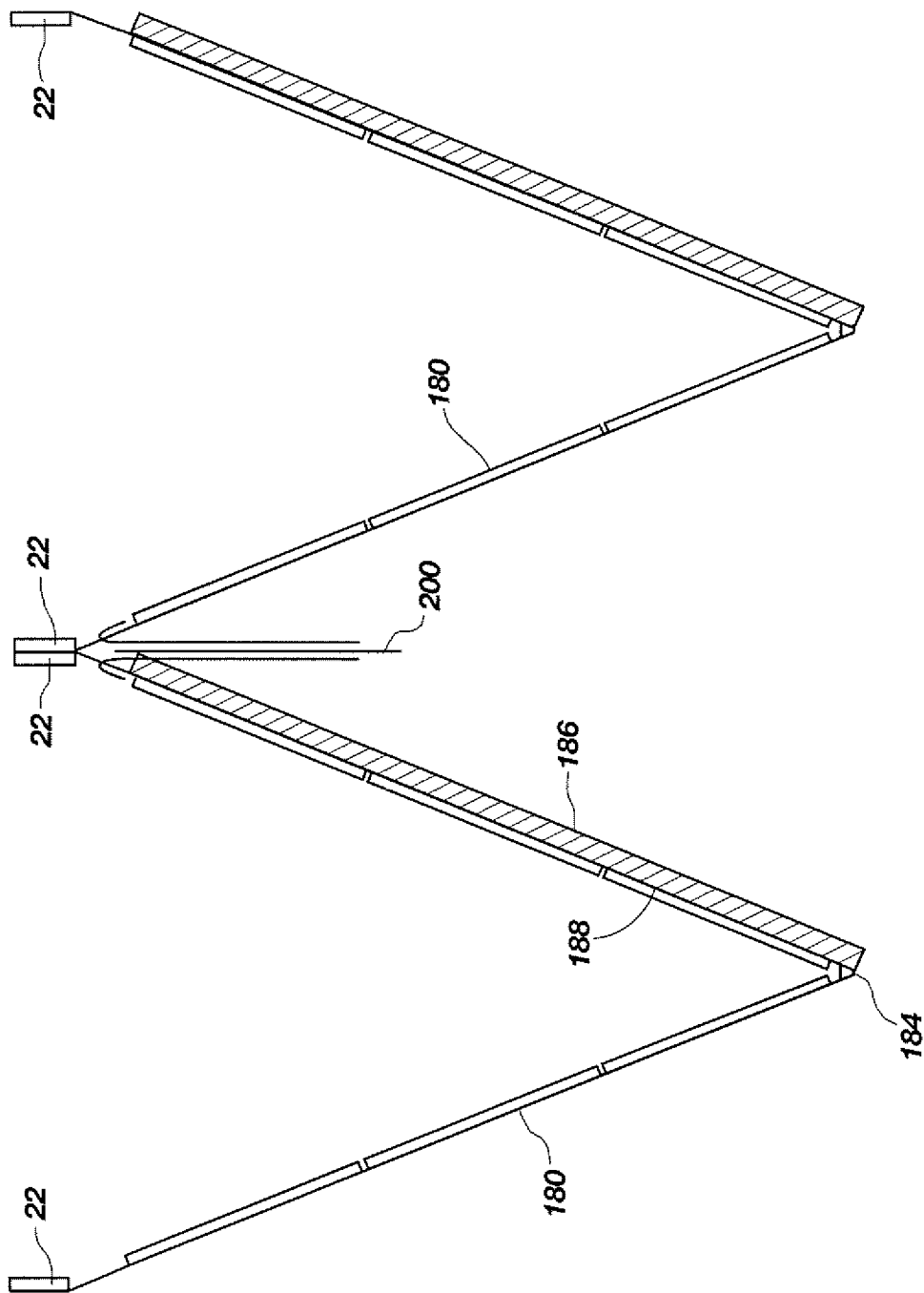
FIG. 14 is a cross-sectional view of two adjacent gores of the solar array assembly.

Referring to drawing FIG. 14, two adjacent gores 180 of the solar array assembly 12 are attached to intermediate spars 22 by any suitable manner of attachment. Each gore 180 includes foam layers 186 attached to a portion thereof. The foam layers 186 are bonded to the gore mesh backside 188 using a suitable silicone adhesive. The foam layers 186 are preferably formed in a pattern array on the backside that allows the layers 186 to nest together when the gores 180 are stacked up when the solar array assembly 12 is in a stowed position. (FIG. 2) The foam layers 186 provide sufficient coverage of the gore 180 for the foam layers 186 to absorb shock to protect the solar cells 182 (FIG. 15) of the stowed solar array assembly 12 from vibration loads during launch. By using a pattern array of foam layers 186 on the backside of the gores 180, a portion of the backside of the solar cells 182 is exposed for radiative cooling and allows for more uniform thermal performance of the photovoltaic properties of the solar cells 182 when operating in a space environment. By attaching the foam layers 186 to the backside of the gores 180, the foam is retained in a known position during assembly of the solar array 10, stowage of the solar array 10 after assembly thereof, launch of the solar array 10, and deployment of the solar array 10.

Figure 15:
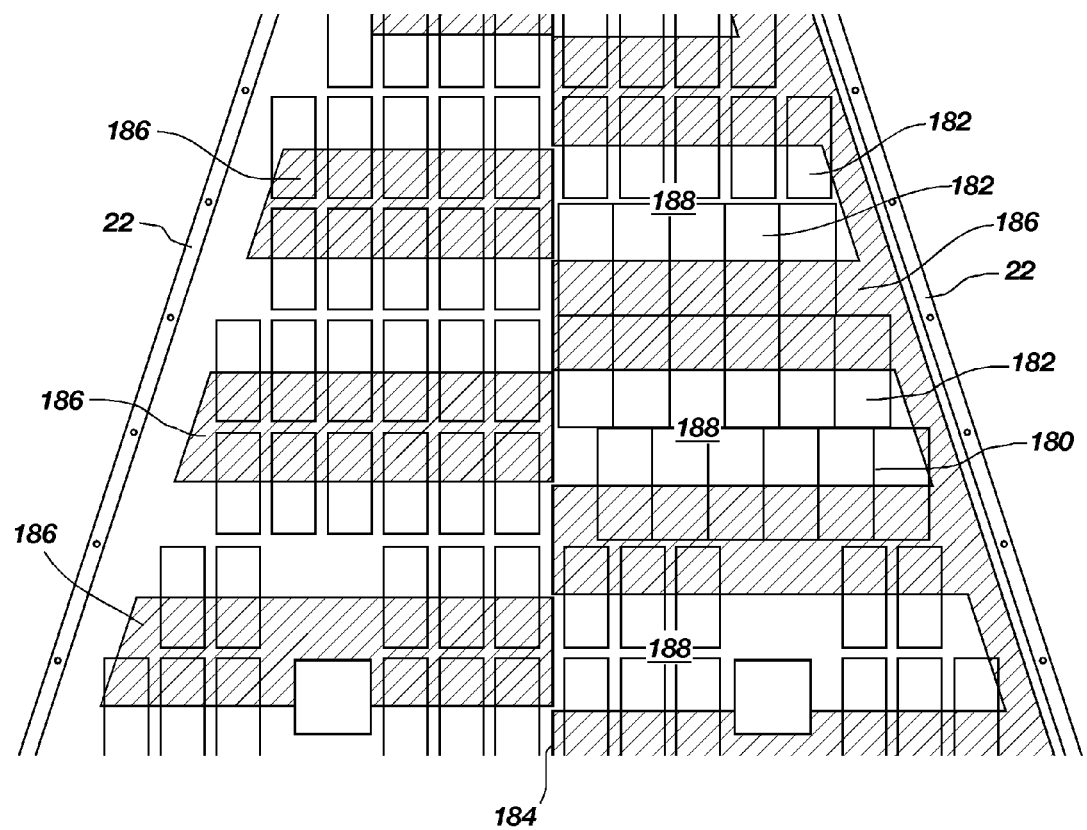
FIG. 15 is a top view of a gore of the solar array assembly.

Referring to drawing FIG. 15, a pattern arrangement of a layer of foam 186 allows for the nesting of the foam layer 186 when the gore 180 is stowed folded in accordion fashion about mid-flexure 184 between adjacent intermediate spars 22. The portion of foam layer 186 located on the left side of mid-flexure 184 folds into the back side 188 of the foam layer 186 located on the right side of the mid-flexure 184. The foam layer 186 is adhesively attached to the back side 188 of the mesh (see FIG. 23) having solar cells 182 attached to the front side thereof.

Figure 16:
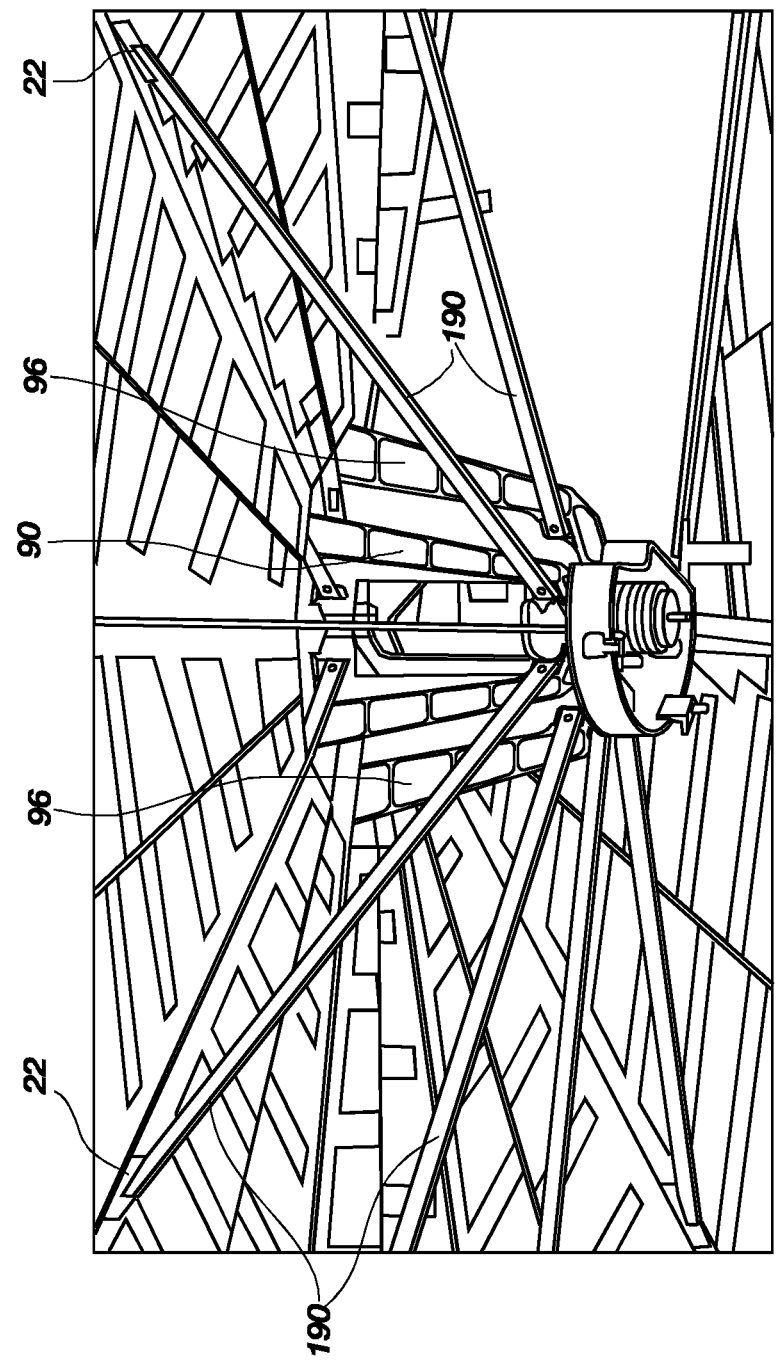
FIG. 16 is a view of the hub assembly having lower spar support struts attached thereto and to intermediate spars.

Referring to drawing FIG. 16, lower spar support struts 190 are attached to a portion of end spar fittings 88, 90, and 96 (see FIG. 6) using any suitable attachment device, such as threaded fasteners, and have the other end thereof attached to the spars 22 of the solar array assembly 12 using any suitable attachment device, such as threaded fasteners. The spar support struts 190 are formed of any suitable material, such as carbon fiber composite material. The spar support struts 190 are secured to the spars 22 at approximately one-third the overall length of the spar 22 from the attachment of the spar 22 to an end spar fitting 88, 90, and 96. The spar support struts 190 provide increased strength to help prevent the buckling of a spar 22 to which a spar support strut 190 is attached. The spar support struts 190 increase the deployed strength (ability to resist in-flight accelerations when deployed) of the solar array 10 by increasing the limit load at which the spar 22 reaches a critical buckling level. The spar support struts 190 also increase the stiffness of the deployed solar array 10 to vibration.

The spar strut supports 190 provide additional support for the intermediate spars 22 and shorten the effective buckling length thereof, thereby increasing the critical bucking load as well as resultant strength of the intermediate spars 22. The intermediate spars 22 and spar support struts 190 provide a triangulated load path transmitting out-of-plane acceleration forces on the solar array assembly 12, hub assembly 26, static panel spar 28, and pivot panel 30 during deployment, and when fully deployed, of the solar array assembly 12.

Figure 17:
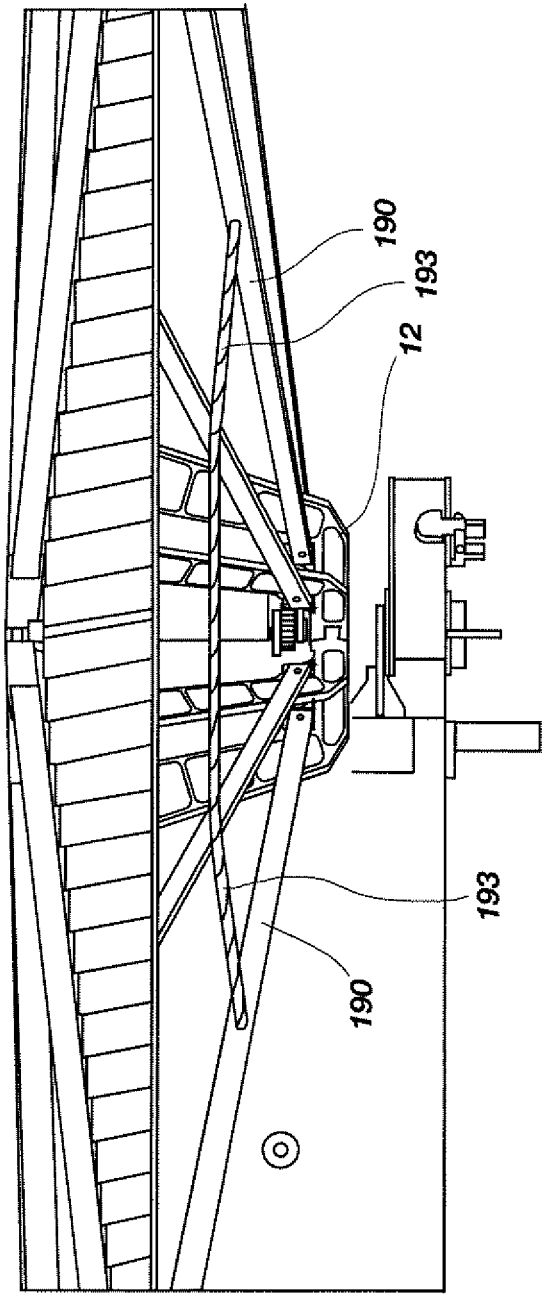
FIG. 17 is a view of a tension cable interconnecting the lower spar support struts.

Referring to drawing FIG. 17, a tension cable 193 may be used to interconnect the spar support struts 190 to provide increased stability and strength to the solar array 10 when deployed. The tension cable 193 may be any suitable type of any suitable material which may be interconnected between the spar support struts 190.

Figure 18:
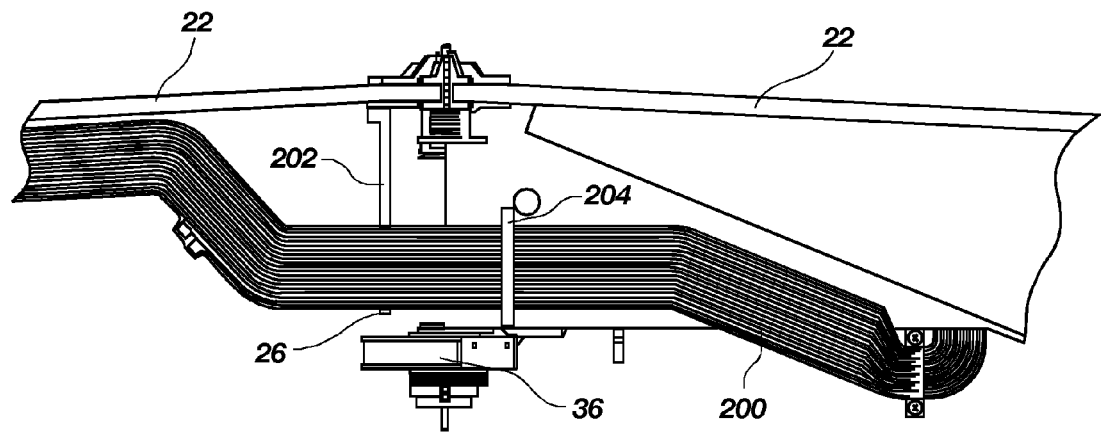
FIG. 18 is a view of a flex circuit power harness.

Referring to drawing FIG. 18, a flex circuit power harness 200 is attached to a spar 22 using a dynamic harness support 202 and to an end spar fitting 88, 90, of 96 using a static harness support 204. The flex circuit power harness 200 includes conductive element comprising single-layer flat copper conductive elements, sized for the maximum current to be carried, having a KAPTON® insulation, available from DuPont, Wilmington, Del., and a suitable protective layer of material bonded on each side thereof. One flex circuit power harness 200 is provided for each gore 180 of the solar array assembly 12. Each flex circuit power harness 200 attaches to or is supported by the underside of the intermediate spars 22 (see FIG. 14). A flex circuit power harness 200 extends along the length of a spar 22 to fan out near the center of the hub assembly 26 to allow flexing of the flex circuit power harness 200 about the axis of rotation of the hub assembly 26. As the flex circuit power harness 200 nears the hub assembly 26, the harness 200 drops down below the spars 22 to clear the moving portions of the hub assembly 26.

The use of the flex circuit power harness 200 provides a lower mass in comparison to that of the use of individual round wire, smaller packaging in comparison to the use of individual round wire, less complexity in comparison to the use of individual round wire, controlled routing in comparison to the use of individual round wire, and greater flexibility in design of the solar array assembly 12 while allowing more simple packaging of the solar array assembly 12 for stowage in comparison to a solar array assembly using individual round wire, more simple kinematics for the deployment of the solar array assembly 12 in comparison to a solar array using individual round wire, and the ability to maintain a minimum weight and volume solar array assembly 12 when stowed in comparison to a solar array assembly using round wire.

Figure 19:
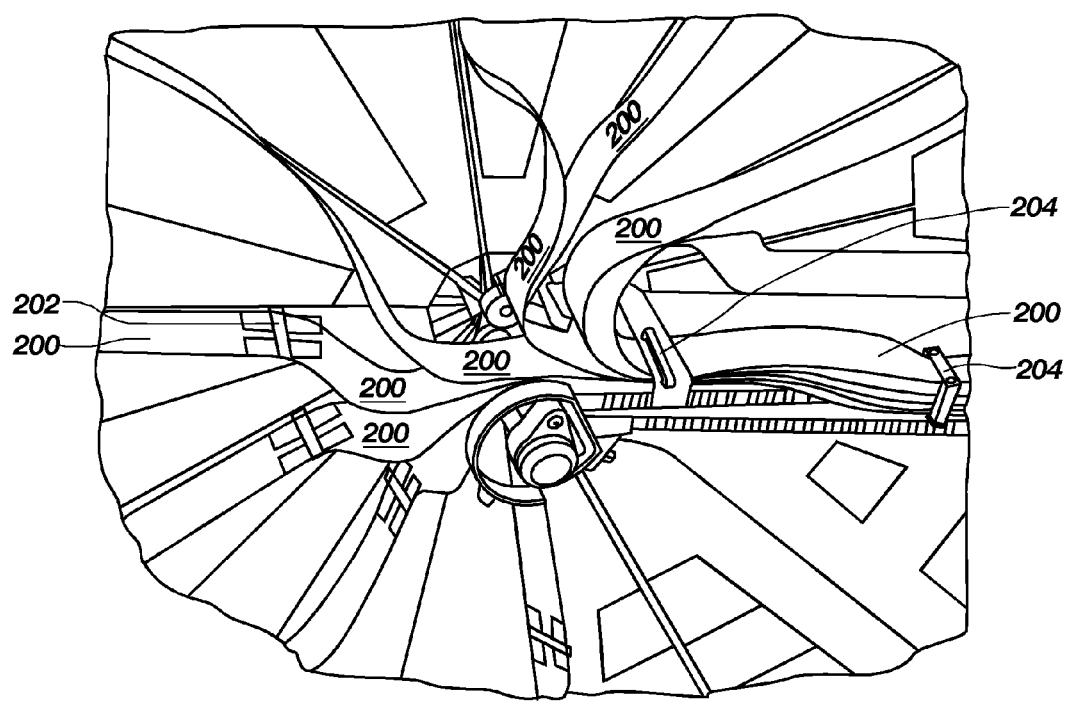
FIG. 19 is a view of a plurality of flex circuit power harnesses and a lower portion of the hub assembly.

Referring to drawing FIG. 19, each flex circuit power harness 200 having static harness support 204 and dynamic harness support 202 are secured together to form a bundle in a stacked arrangement for a minimum volume configuration for the stowed position of the solar array 10.

Figure 20:
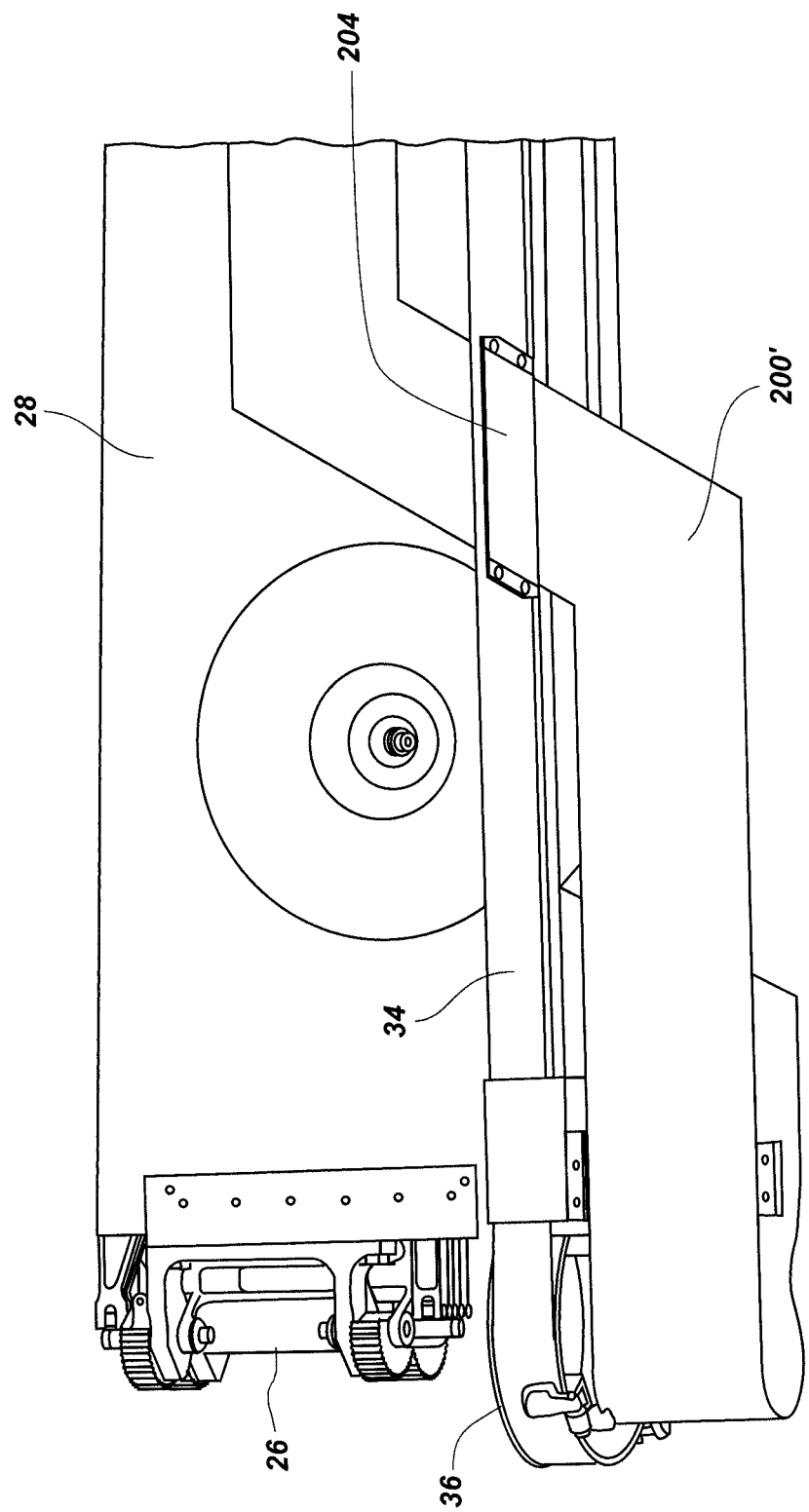
FIG. 20 is a view of a flex circuit power harness mounted on the static panel spar.

Referring to drawing FIG. 20, the stacked flex circuit power harness 200' is wrapped around the bottom of hub assembly 26 avoiding the rotating portions of the hub assembly 26 and extending along the static panel spar 28 being secured thereto by the static harness support 204.

Figure 21:
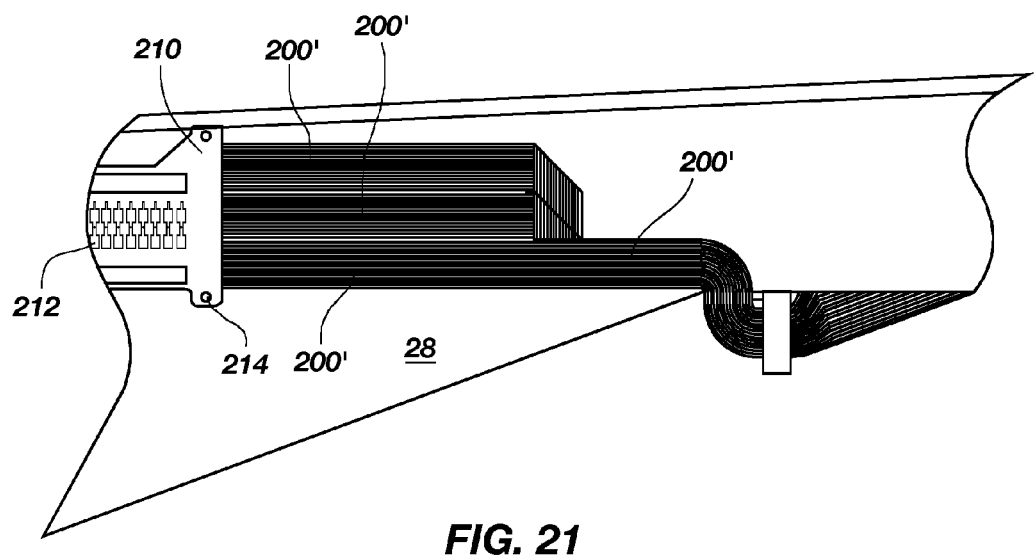
FIG. 21 is a view of a stacked plurality of flex circuit power harnesses and a diode board assembly.

Referring to drawing FIG. 21, the stacked assembly 200' of flex circuit power harness 200 is secured to the static panel spar 28 terminating into a diode board assembly 210 which is secured to static panel spar 28 using any suitable fastening apparatus 214. The diode board 210 comprises a suitable printed circuit board having the desired predetermined circuits therein. The printed circuit board allows for the compact packaging for an organized interface with the flex circuit power harness 200. A plurality of diodes 212 is mounted to the outer surface of the diode board assembly 210 and is electrically integrated into the overall electrical circuits via soldering the leads of the diodes 212 through plated holes and making electrical contact with the specific desired layer of circuits within the printed circuit board. By mounting the diode board assembly 210 and stack of flex circuit power harness 200' on the static panel spar 28, the diode board assembly 210 is moved from the stack of the flex circuit power harness 200', preventing the diode assemblies of the diode board assembly 210 from being compressed when the solar array 10 is stowed and allows for a more simple organized interface of the flex circuit power harness 200 from each of the gores 180 (FIG. 1).

Figure 22:
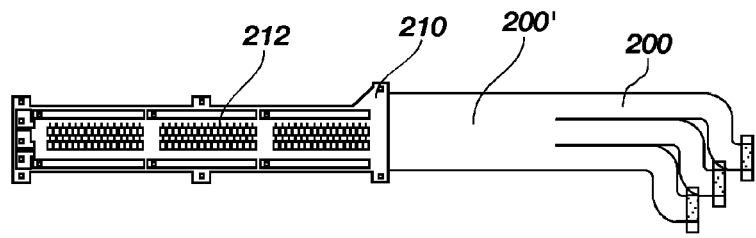
FIG. 22 is a view of a plurality of flex circuit power harnesses and a diode board assembly.

Referring to drawing FIG. 22, a generalized layout of a plurality of flex circuit power harness 200 in relation to the diode board assembly 210 is illustrated relative to the static panel spar 22.

Figure 23:
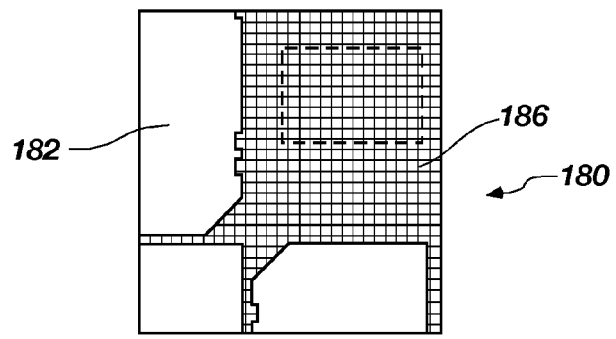
FIG. 23 is a view of a portion of a gore.

Referring to drawing FIG. 23, a portion of a gore 180 includes a solar cell 182 attached to a suitable lightweight open-weave foam layer 186, such as a VECTRAN® mesh, available from (Kuraray America, New York, N.Y. 10022).

Figure 24:
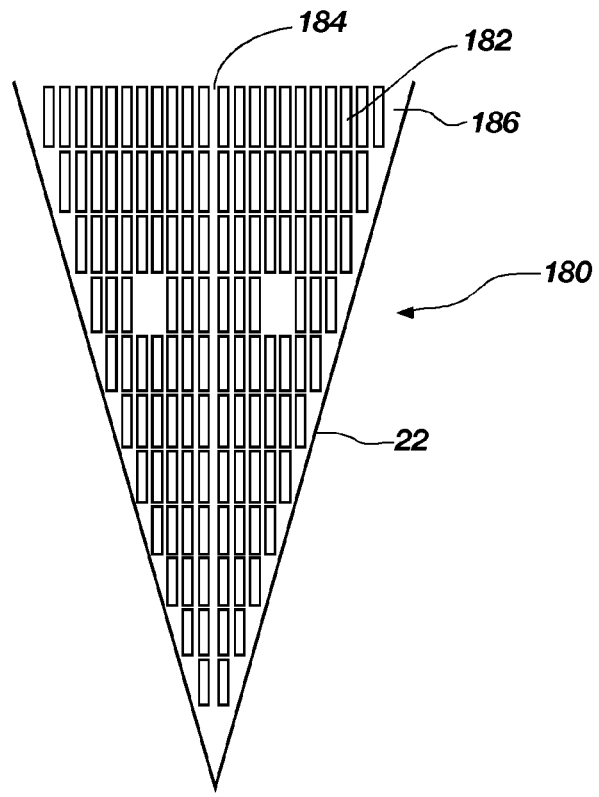
FIG. 24 is a view of a gore.

Referring to drawing FIG. 24, a typical triangular shaped gore 180 includes a plurality of solar cells 182 attached to the open-weave foam layer 186 which is attached to intermediated spars 22. The gore 180 has a mid-flexure 184 for the accordion fashion folding of the gore 180 for stowage. Any desired number of gores 180 may be used in the solar array assembly 12 depending upon the amount of current to be supplied by the solar array assembly 12.

Referring to drawing FIG. 25, which includes drawing FIGS. 25A through 25F, as shown in drawing FIG. 25A the solar array 10 is mounted on the space craft 42 in a tie-down position prior to actuation of the various release mechanisms retaining the solar array 10 on the space craft 42. Initially, the tie-down mechanisms, typically a FRANGIBOLT® available from TiNi Aerospace, Inc., San Leandro, Calif., located between the wing assembly 16 (FIG. 1) formed by the solar array 10 in the stowed position and the space craft 42, thereby holding the solar array 10 in the stowed position on the space craft 42, are actuated to allow release of the stowed solar array 10 for deployment. The stepper deployment motor 48 (FIG. 4) is actuated to cause the wing to deploy until 180 degree staging is complete as shown in drawing FIG. 25B at which the wing is latched in position using suitable apparatus with the motor 48 ceasing. As illustrated in drawing FIG. 25C, the apparatus, typically FRANGIBOLT® holding the static panel spar 28 and pivot panel 30 together with the solar array assembly 12 being stowed therebetween in an accordion fashion, is actuated to allow the pivot panel 30 freedom of rotational movement with respect to the static panel spar 28. As illustrated in drawing FIG. 25D, the motor 48 is again actuated to drive tape 34 (FIG. 2) to cause the pivot panel 30 to rotate away from static panel spar 28 and about hub assembly 26 unfolding the solar array assembly 12 about the hub assembly 26. As illustrated in drawing FIG. 25E, the tension on the tape 34 causes the wing to unfurl the solar array assembly 12 in a continuous manner about the hub assembly 26. As illustrated in drawing FIG. 25F, the solar array assembly 12 is fully deployed with the pivot panel 30 being latched to the static panel spar 28 using a suitable apparatus with the lead intermediate spar 22 engaging the spring elements 170 (see FIG. 13) attached to the static panel spar 28 to keep the desired preload tension on the solar array assembly 12. The motor 48 is then shut off leaving the solar array assembly 12 in a fully deployed, preloaded tension, and latched configuration.

It will be evident from the foregoing that modifications and substitutions to the solar array can be made, such as the use of any number of gore assemblies, the use of different material as the mesh in the gore, the use of different mechanisms than tape to deploy the solar assembly, the use of more tensioning cables, etc. all of which are within the scope of the solar assembly.

The invention claimed is:

1. A solar array comprising:
gores having solar cells thereon, the gores configured to form a generally circular shape when the solar array is deployed; and
a hub assembly about which the gores rotate during deployment, the hub assembly located at a center of the generally circular shape when the solar array is deployed, the hub assembly including a plurality of end spar fittings, each end spar fitting of the plurality of end spar fittings including a first end having a clevis and a second end extending radially away from the first end and the hub assembly, the clevis on the first end of each end spar fitting of the plurality of end spar fittings having at least one pin, the at least one pin of the clevis on the first end of each end spar fitting of the plurality of end spar fittings being connected by a link to the at least one pin of the clevis on the first end of an immediately adjacent end spar fitting of the plurality of end spar fittings,
wherein each respective at least one pin of the clevises is parallel to each other respective at least one pin of the clevises.

2. The solar array of claim 1, further comprising:
a first spar extending radially from the hub including a spring having one end thereof attached to the first spar and the other end of the spring attached to an adjacent second spar that extends radially from the hub assembly.

3. The solar array of claim 1, further comprising:
foam attached to a portion of at least one gore of the gores.

4. The solar array of claim 1, further comprising:
a pair of split timing gears engaging another gear in the hub assembly.

5. The solar array of claim 1, further comprising:
at least one upper spar attached to an upper portion of a corresponding end spar fitting of the hub assembly; and
a lower support spar having one end attached to a lower portion of the corresponding end spar fitting of the hub assembly and the other end directly attached to the at least one upper spar.

6. The solar array of claim 1, further comprising:
a flex circuit harness.

7. The solar array of claim 1, further comprising:
a diode panel assembly attached to at least one flex circuit harness.

8. The solar array of claim 1, further including:
a hub bracket; and
a hub link attached to the hub bracket, an end spar fitting attached to the hub link.

9. The solar array of claim 8, wherein one side of the hub bracket is attached to the end of one of a static panel spar and a pivot panel having the plurality of end spar fittings attached to the other side thereof.

10. A solar array comprising:
a hub assembly comprising:
a pair of split timing gears attached to and positioned at an upper portion of the hub assembly and having a rotational axis coaxially aligned with a rotational axis of a lower gear attached to and positioned at a lower portion of the hub assembly; and another gear engaged with the pair of split timing gears;
a first spar having a length extending radially away from the hub assembly including a spring having one end thereof attached directly to the first spar and the other end of the spring attached directly to an adjacent second spar that extends radially from the hub assembly; and
solar panel gores extending radially away from the hub assembly, one of the solar panel gores being coupled to the adjacent second spar,
wherein the spring is directly attached to the first spar and to the adjacent second spar and configured to apply tension to the gores when the solar array is deployed.

11. The solar array of claim 10, wherein the first spar comprises one of a static panel spar and a pivot panel.

12. The solar array of claim 10, wherein the spring comprises a leaf spring.

13. The solar array of claim 10, wherein the spring comprises a spring rotatably attached to the first spar and to the adjacent second spar.

14. The solar array of claim 10, wherein the spring comprises at least two leaf springs stacked together.

15. The solar array of claim 3, wherein each gore of the gores has a mid-flexure, wherein the foam attached to a portion of at least one gore of the gores comprises:
at least one first piece of foam bonded to a first portion of a backside of the at least one gore on a first side of the mid-flexure thereof, the at least one first piece of foam having at least one shaped void exposing at least a portion of the backside of the at least one gore; and
at least one second piece of foam bonded to a second portion of the backside of the at least one gore on a second side of the mid-flexure, the at least one second piece of foam sized and shaped to at least substantially fill the at least one shaped void of the at least one first piece of foam when the at least one gore is folded along the mid-flexure of the at least one gore.

16. The solar array of claim 15, wherein the at least one first piece of foam comprises a single piece of foam and wherein the at least one second piece of foam comprises a plurality of pieces of foam.

17. The solar array of claim 15, wherein the at least one gore comprises a mesh member having the solar cells located on one side thereof and the at least one first piece of foam and the at least one second piece of foam located on an opposite side thereof.

18. The solar array of claim 10, wherein the pair of split timing gears comprises a first gear adjacent to and vertically aligned with a second gear located above the first gear.

19. The solar array of claim 10, wherein the hub assembly further comprises an additional pair of split timing gears, the additional pair of split timing gears engaging the lower gear and having a rotational axis coaxially aligned with a rotational axis of the another gear.

20. The solar array of claim 10, wherein the pair of split timing gears includes a first gear and a second gear having an adjustment apparatus located therebetween.

* * * * *